United States Patent
Chu et al.

(10) Patent No.: US 10,972,196 B1
(45) Date of Patent: Apr. 6, 2021

(54) TRIGGER FRAME FOR RANGING

(71) Applicant: NXP USA, Inc., Austin, TX (US)

(72) Inventors: Liwen Chu, San Ramon, CA (US); Christian R. Berger, San Jose, CA (US); Niranjan Grandhe, San Jose, CA (US); Hongyuan Zhang, Fremont, CA (US); Hui-Ling Lou, Sunnyvale, CA (US)

(73) Assignee: NXP USA, INC., Austin, TX (US)

( * ) Notice: Subject to any disclaimer, the term of this patent is extended or adjusted under 35 U.S.C. 154(b) by 367 days.

(21) Appl. No.: 16/044,198

(22) Filed: Jul. 24, 2018

Related U.S. Application Data

(60) Provisional application No. 62/637,943, filed on Mar. 2, 2018, provisional application No. 62/567,024, filed on Oct. 2, 2017, provisional application No. 62/536,374, filed on Jul. 24, 2017.

(51) Int. Cl.
  *H04B 17/27* (2015.01)
  *G01S 13/76* (2006.01)
  *H04W 84/12* (2009.01)

(52) U.S. Cl.
  CPC ............ *H04B 17/27* (2015.01); *G01S 13/765* (2013.01); *H04W 84/12* (2013.01)

(58) Field of Classification Search
  CPC ....... H04B 17/27; G01S 13/765; H04W 84/12
  See application file for complete search history.

(56) References Cited

U.S. PATENT DOCUMENTS

| | | |
|---|---|---|
| 9,166,660 B2 | 10/2015 | Chu et al. |
| 2005/0026563 A1 | 2/2005 | Leeper et al. |
| 2011/0261708 A1 | 10/2011 | Grandhi |

(Continued)

OTHER PUBLICATIONS

IEEE P802.11ax™/D1.0, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," IEEE Computer Society, 453 pages (Nov. 2016).

(Continued)

*Primary Examiner* — Hassan Kizou
*Assistant Examiner* — Abdullahi Ahmed

(57) ABSTRACT

A first communication device generates and transmits a first trigger frame. One or more trigger type information fields of the first trigger frame are set to a first one or more respective values that indicates the first trigger frame is for: i) a multi-user (MU) ranging measurement procedure, and ii) causing multiple second communication devices to simultaneously transmit first null data packets (NDPs) as part of a first MU transmission associated with the MU ranging measurement procedure. The first communication device generates and transmits a second trigger frame. One or more trigger type information fields of the second trigger frame are set to a second one or more respective values that indicates the second trigger frame is for i) an MU ranging measurement procedure, and ii) causing the multiple second communication devices to simultaneously transmit feedback packets to the first communication device as part of a second MU transmission associated with the MU ranging measurement procedure.

24 Claims, 12 Drawing Sheets

(56) References Cited

U.S. PATENT DOCUMENTS

| | | |
|---|---|---|
| 2013/0229996 A1 | 9/2013 | Wang et al. |
| 2015/0131517 A1 | 5/2015 | Chu et al. |
| 2016/0029373 A1 | 1/2016 | Seok |
| 2016/0323879 A1 | 11/2016 | Ghosh et al. |
| 2017/0188390 A1 | 6/2017 | Adachi et al. |
| 2017/0202026 A1 | 7/2017 | Ahn et al. |
| 2017/0279864 A1 | 9/2017 | Chun et al. |
| 2018/0027561 A1 | 1/2018 | Segev et al. |
| 2018/0310133 A1* | 10/2018 | Ramasamy ......... H04W 64/003 |
| 2018/0310194 A1* | 10/2018 | Yang ..................... H04W 4/025 |
| 2019/0007973 A1* | 1/2019 | Lou ................... H04W 74/0816 |
| 2019/0014491 A1* | 1/2019 | Seok ....................... H04L 63/12 |
| 2019/0132294 A1* | 5/2019 | Li .......................... H04W 12/06 |
| 2019/0200383 A1* | 6/2019 | Jiang ..................... G01S 5/0205 |
| 2019/0306825 A1* | 10/2019 | Lindskog .............. H04W 24/08 |
| 2020/0029236 A1* | 1/2020 | Segev ................... H04W 88/06 |

OTHER PUBLICATIONS

IEEE P802.11ax™/D2.2, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," IEEE Computer Society, 620 pages (Feb. 2018).

IEEE Std 802.11-REVmc™/D8.0 (revision of IEEE Std. 802.11™-2012) "Draft Standard for Information technology—Telecommunications and information exchange between systems—Local and metropolitan area networks—Specific requirements" Part 11: Wireless LAN Medium Access Control (MAC) and Physical Layer (PHY) Specifications, *The Institute of Electrical and Electronics Engineers, Inc.*, 3774 pages (Aug. 2016).

Kwon et al., "SIG Structure for UL PPDU," IEEE Draft, doc. IEEE 802.11-15/0574r0, vol. 802.11ax, 18 pages (May 11, 2015).

Merlin et al., "Trigger Frame Format," IEEE Draft, doc. IEEE 802.11-15/0877r1, vol. 802.11ax, No. 1, 16 pages (Jul. 13, 2015).

Tandai et al., "An Efficient Uplink Multiuser MIMO Protocol in IEEE 802.11 WLANs," IEEE 20th International Symposium on Personal, Indoor and Mobile Radio Communications (PIMRC 2009), pp. 1153-1157 (Sep. 13, 2009).

Zhu et al., "IEEE P802.11, Wireless LANs, Proposed 802.11az Functional Requirements," *Institute of Electrical and Electronics Engineers*, doc. IEEE 802.11-16/0424r4, 6 pages (Mar. 13, 2017).

U.S. Appl. No. 62/505,443, Chu et al., "Null Data Packet Announcement (NDPA) and Trigger for EFTM Null Data Packet (NDP) Ranging," filed May 12, 2017.

U.S. Appl. No. 15/977,643, Chu et al., "Null Data Packet (NDP) Announcement rame and Trigger Frame for NDP Ranging," filed May 11, 2018.

\* cited by examiner

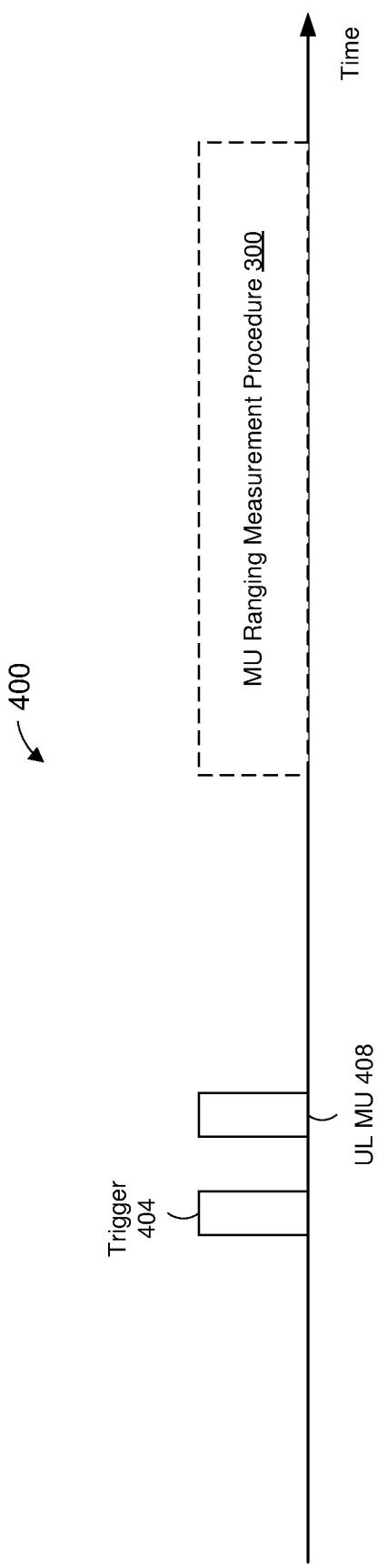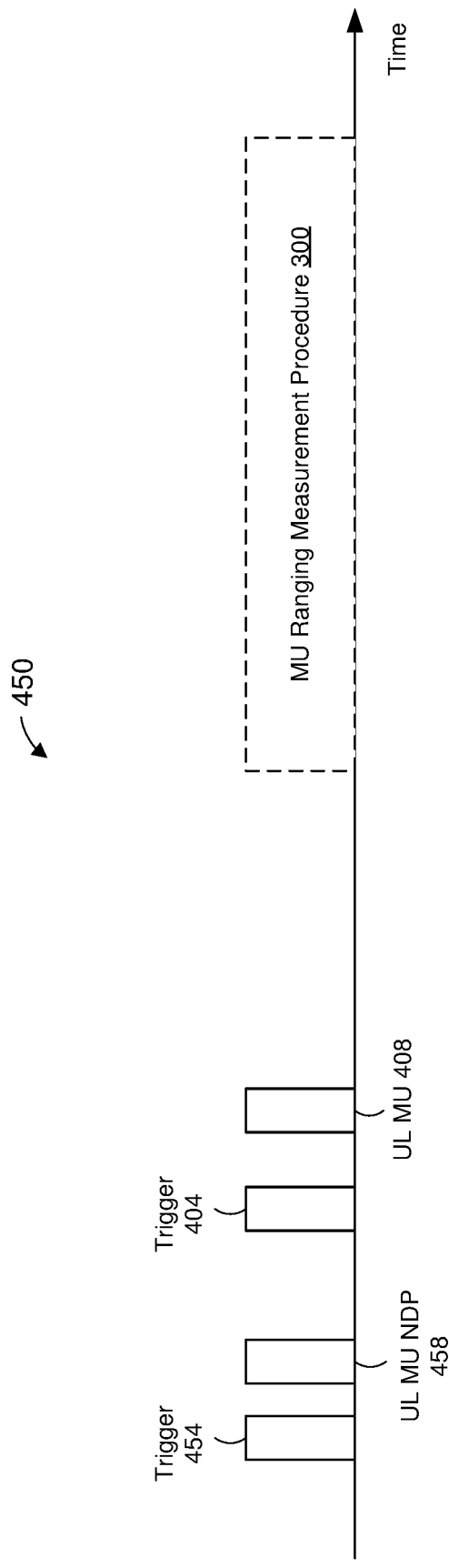

FIG. 6A

| Trigger Type 602 | Length 604 | Cascade Indication 606 | CS Required 608 | BW 610 | GI and LTF Type 612 | MU-MIMO LTF Mode 614 | Number of HE-LTF Symbols 616 | STBC 618 |
|---|---|---|---|---|---|---|---|---|
| 4 | 12 | 1 | 1 | 2 | 2 | 1 | 3 | 1 |

Bits:

↙ 600

| LDPC Extra Symbol Segment 620 | AP TX Power 622 | Packet Extension 624 | Spatial Reuse 626 | Doppler 628 | HE-SIG-A Reserved 630 | Reserved 632 | Trigger Dependent Common Info 634 |
|---|---|---|---|---|---|---|---|
| 1 | 6 | 3 | 16 | 1 | 9 | 1 | Variable |

Bits:

| Trigger Subtype 636 | Reserved 638 |
|---|---|
| 2 | 6 |

Bits:

FIG. 7A

| AID 12 702 | RU Allocation 704 | Coding Type 706 | MCS 708 | DCM 710 | SS Allocation/ RA-RU information 712 | Target RSSI 714 | ACK Indication 716 | Trigger Dependent User Info 718 |
|---|---|---|---|---|---|---|---|---|
| 12 | 8 | 1 | 4 | 1 | 6 | 7 | 1 | Variable |

Bits:

| MPDU MU Spacing Factor 734 | TID Aggregation Limit 736 | Ranging Measurement Request = 0 732 | Preferred AC 738 |
|---|---|---|---|
| 4 | 12 | 2 | 2 |

Bits:

| Trigger Subtype 740 | Reserved 742 | Ranging Measurement Request = 1 732 | Reserved 744 |
|---|---|---|---|
| 4 | 12 | 2 | 2 |

Bits:

| Feedback Type 760 | Feedback Size 762 | Scheduling Type 764 | Group ID 766 | Starting STA 768 | Target RSSI 770 | Number of Users Per Set of Tones 772 | Resource Request Buffer Threshold 774 |
|---|---|---|---|---|---|---|---|
| 4 | 6 | 2 | 6 | 11 | 7 | 2 | 4 |

Bits:

FIG. 8A

| AID12 702 | Security Authentication Code 802 | SS Allocation/ RA-RU information 712 | Target RSSI 714 | Reserved 804 |
|---|---|---|---|---|
| Bits: 12 | 14 | 6 | 7 | 1 |

| Trigger Subtype 636 | SAC MSB 806 |
|---|---|
| Bits: 4 | 12 |

| AID12 702 | SAC LSB 808 | SS Allocation/ RA-RU information 712 | Target RSSI 714 | Reserved 804 |
|---|---|---|---|---|
| Bits: 12 | 14 | 6 | 7 | 1 |

↙ 820

TRIGGER FRAME FOR RANGING

CROSS REFERENCES TO RELATED APPLICATIONS

This application claims the benefit of U.S. Provisional Patent Application No. 62/536,374, entitled "Method and Apparatus for Performing Ranging Measurements in a Wireless Network—802.11az," filed on Jul. 24, 2017, U.S. Provisional Patent Application No. 62/567,024, entitled "11az Trigger Frame," filed on Oct. 2, 2017, and U.S. Provisional Patent Application No. 62/637,943, entitled "11az Trigger Frame," filed on Mar. 2, 2018. The disclosures of all of the applications referenced above are expressly incorporated herein by reference in their entireties.

FIELD OF TECHNOLOGY

The present disclosure relates generally to wireless communication systems, and more particularly to communication exchanges between wireless communication devices for ranging measurements among the wireless communication devices.

BACKGROUND

Wireless local area networks (WLANs) have evolved rapidly over the past decade, and development of WLAN standards such as the Institute for Electrical and Electronics Engineers (IEEE) 802.11 Standard family has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 510 Mbps, and the IEEE 802.11ac Standard specifies a single-user peak throughput in the gigabits per second (Gbps) range. Future standards promise to provide even greater throughput, such as throughputs in the tens of Gbps range.

Some mobile communication devices include a WLAN network interface and satellite positioning technology, such as global positioning system (GPS) technology. GPS technology in mobile communication devices is useful for navigating to a desired location, for example. However, GPS technology does not typically provide accurate location information when a GPS receiver is not in direct sight of a GPS satellite, and thus GPS technology is often not useful for providing location information while a mobile communication device is within a building such as an airport, a shopping mall, etc., within a tunnel, etc.

Techniques for determining a position of a communication device using WLAN technology are now under development. For example, a distance between a first communication and a second communication device is determined by measuring a time of flight of WLAN transmissions between the first communication device and the second communication device, and calculating the distance based on the time of flight. Similarly, distances between the first communication device and multiple third communication devices are determined. Then, the determined distances are used to estimate a location of the first communication device by employing, for example, a triangulation technique. For a first communication device having multiple antennas, an angle of departure (AoD) of a WLAN transmission can be determined. Similarly, for a second communication device having multiple antennas, an angle of arrival (AoA) of the WLAN transmission from the first communication device can be determined. The AoD and the AoA, along with the determined distances, can be also be used for estimating the location of the first communication device.

SUMMARY

In an embodiment, a method for performing ranging measurements includes: generating, at a first communication device, a first trigger frame according to a trigger frame format that includes one or more trigger type information fields for indicating a type of multi-user (MU) frame exchange to which a trigger frame instance corresponds. Generating the first trigger frame includes: setting the one or more trigger type information fields of the first trigger frame to a first one or more respective values that indicates the first trigger frame is for: i) an MU ranging measurement procedure, and ii) causing multiple second communication devices from among a plurality of second communication devices to simultaneously transmit first null data packets (NDPs) to the first communication device as part of a first MU transmission associated with the MU ranging measurement procedure. The method also includes: transmitting, by the first communication device, the first trigger frame to cause the multiple second communication devices to transmit the first NDPs as part of the first MU transmission; receiving, at the first communication device, the first MU transmission having multiple first NDPs transmitted simultaneously by at least some of the multiple second communication devices; transmitting, by the first communication device, a second NDP to the multiple second communication devices as part of the MU ranging measurement procedure; and generating, at the first communication device, a second trigger frame according to the trigger frame format. Generating the second trigger frame includes: setting the one or more trigger type information fields of the second trigger frame to a second one or more respective values that indicates the second trigger frame is for i) an MU ranging measurement procedure, and ii) causing the multiple second communication devices to simultaneously transmit feedback packets to the first communication device as part of a second MU transmission associated with the MU ranging measurement procedure. The method further includes: transmitting, by the first communication device, the second trigger frame to cause the multiple second communication devices to transmit the feedback packets as part of the second MU transmission; receiving, at the first communication device, the second MU transmission having multiple feedback packets transmitted simultaneously by at least some of the multiple second communication devices, the multiple feedback packets including ranging measurement feedback information; and calculating, at the first communication device, one or more respective distances between the first communication device and at least one of the multiple second communication devices using the measurement feedback information received in the second MU transmission.

In another embodiment, an apparatus comprises: a network interface device associated with a first communication device. The network interface device includes one or more integrated circuits (ICs), and is configured to: generate a first trigger frame according to a trigger frame format that includes one or more trigger type information fields for indicating a type of multi-user (MU) frame exchange to which a trigger frame instance corresponds. Generating the first trigger frame includes: setting the one or more trigger type information fields of the first trigger frame to a first one or more respective values that indicates the first trigger frame is for i) an MU ranging measurement procedure, and ii) causing multiple second communication devices from among a plurality of second communication devices to simultaneously transmit first null data packets (NDPs) to the first communication device as part of a first MU transmission associated with the MU ranging measurement procedure. The network interface device is also configured to: transmit the first trigger frame to cause the multiple second communication devices to transmit the first NDPs as part of the first MU transmission; receive the first MU transmission having multiple first NDPs transmitted simultaneously by at least some of the multiple second communication devices; transmit a second NDP to the multiple second communication devices as part of the MU ranging measurement procedure; and generate a second trigger frame according to the trigger frame format. Generating the second trigger frame includes: setting the one or more trigger type information fields of the second trigger frame to a second one or more respective values that indicates the second trigger frame is for i) an MU ranging measurement procedure, and ii) causing the multiple second communication devices to simultaneously transmit feedback packets to the first communication device as part of a second MU transmission associated with the MU ranging measurement procedure. The network interface device is further configured to: transmit the second trigger frame to cause the multiple second communication devices to transmit the feedback packets as part of the second MU transmission; receive the second MU transmission having multiple feedback packets transmitted simultaneously by at least some of the multiple second communication devices, the multiple feedback packets including ranging measurement feedback information; and calculate one or more respective distances between the first communication device and at least one of the multiple second communication devices using the measurement feedback information received in the second MU transmission.

In yet another embodiment, a method for performing ranging measurements includes: receiving, at a first communication device and from a second communication device, a first trigger frame according to a trigger frame format that includes one or more trigger type information fields for indicating a type of multi-user (MU) frame exchange to which a trigger frame instance corresponds. The first trigger frame includes: the one or more trigger type information fields of the first trigger frame set to a first one or more respective values that indicates the first trigger frame is for i) an MU ranging measurement procedure, and ii) causing the first communication device and one or more third communication devices to simultaneously transmit respective first null data packets (NDPs) to the second communication device as part of a first MU transmission associated with the MU ranging measurement procedure. The method also includes: transmitting, by the first communication device to the second communication device, a first NDP as part of the first MU transmission in response to the first trigger frame; receiving, at the first communication device and from the second communication device, a second NDP as part of the MU ranging measurement procedure; and receiving, at the first communication device and from the second communication device, a second trigger frame according to the trigger frame format. The second trigger frame includes: the one or more trigger type information fields of the second trigger frame set to a second one or more respective values that indicates the second trigger frame is for i) an MU ranging measurement procedure, and ii) causing the first communication device and the one or more third communication devices to simultaneously transmit respective feedback packets to the second communication device as part of a second MU transmission associated with the MU ranging measurement procedure. The method further includes: transmitting, by the first communication device to the second communication device, a feedback packet as part of the second MU transmission in response to the second trigger frame, the feedback packet including ranging measurement feedback information, wherein the ranging measurement feedback information is useable at the second communication device to calculate a distance between the first communication device and the second communication device.

In still another embodiment, an apparatus comprises: a network interface device associated with a first communication device. The network interface device includes one or more integrated circuits (ICs), and is configured to: receive, from a second communication device, a first trigger frame according to a trigger frame format that includes one or more trigger type information fields for indicating a type of multi-user (MU) frame exchange to which a trigger frame instance corresponds. The first trigger frame includes: the one or more trigger type information fields of the first trigger frame set to a first one or more respective values that indicates the first trigger frame is for i) an MU ranging measurement procedure, and ii) causing the first communication device and one or more third communication devices to simultaneously transmit respective first null data packets (NDPs) to the second communication device as part of a first MU transmission associated with the MU ranging measurement procedure. The network interface device is also configured to: transmit, to the second communication device, a first NDP as part of the first MU transmission in response to the first trigger frame; receive, from the second communication device, a second NDP as part of the MU ranging measurement procedure; and receive, from the second communication device, a second trigger frame according to the trigger frame format. The second trigger frame includes: the one or more trigger type information fields of the second trigger frame set to a second one or more respective values that indicates the second trigger frame is for i) an MU ranging measurement procedure, and ii) causing the first communication device and the one or more third communication devices to simultaneously transmit respective feedback packets to the second communication device as part of a second MU transmission associated with the MU ranging measurement procedure. The network interface device is further configured to: transmit, to the second communication device, a feedback packet as part of the second MU transmission in response to the second trigger frame, the feedback packet including ranging measurement feedback information, wherein the ranging measurement feedback information is useable at the second communication device to calculate a distance between the first communication device and the second communication device.

BRIEF DESCRIPTION OF THE DRAWINGS

FIG. 4A is a timing diagram of another example MU ranging measurement procedure, according to an embodiment.

FIG. 4B is a timing diagram of another example MU ranging measurement procedure, according to an embodiment.

FIG. 6A is an example format of a common information field within a trigger frame, according to an embodiment.

FIG. 6B is an example format of a trigger dependent common information subfield in a common information field within a trigger frame, according to an embodiment.

FIG. 7A is an example format of a user information field within a trigger frame, according to an embodiment.

FIG. 7B is an example format of a trigger dependent user information subfield in a user information field within a trigger frame, according to an embodiment.

FIG. 7C is an example format of a trigger dependent user information subfield in a user information field within a trigger frame, according to another embodiment.

FIG. 7D is an example format of a trigger dependent user information subfield in a user information field within a trigger frame, according to another embodiment.

FIG. 8A is an example format of a trigger dependent user information subfield in a user information field within a trigger frame, according to another embodiment.

FIG. 8B is an example format of a trigger dependent common information subfield in a common information field within a trigger frame, according to another embodiment.

FIG. 8C is an example format of a trigger dependent user information subfield in a user information field within a trigger frame, according to another embodiment.

DETAILED DESCRIPTION

Ranging measurement procedures and techniques described below are discussed in the context of wireless local area networks (WLANs) that utilize protocols the same as or similar to protocols defined by the 802.11 Standard from the Institute of Electrical and Electronics Engineers (IEEE) merely for explanatory purposes. In other embodiments, however, ranging measurement procedures and techniques are utilized in other types of wireless communication systems such as personal area networks (PANs), mobile communication networks such as cellular networks, metropolitan area networks (MANs), etc.

Figure 1:
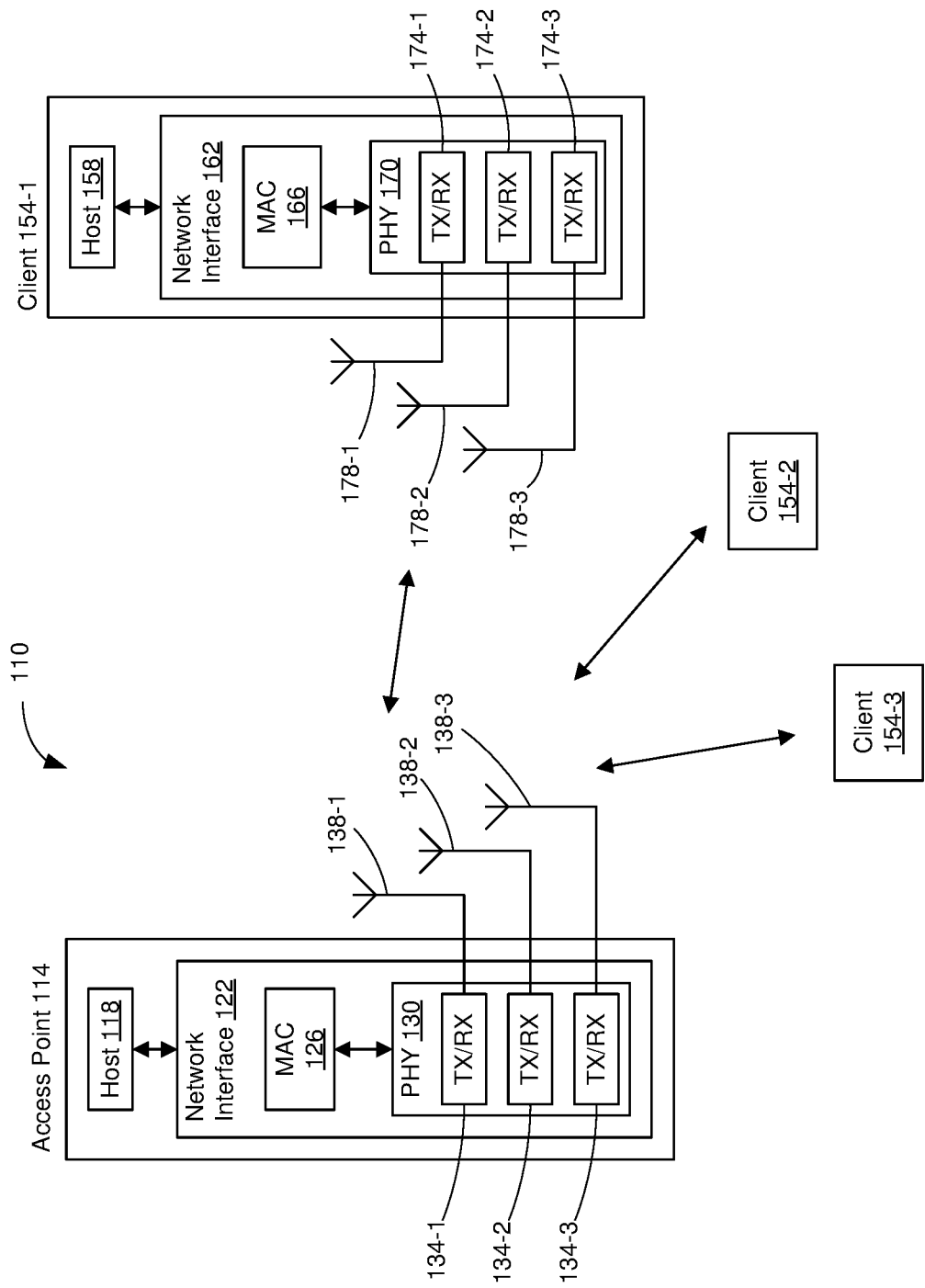
FIG. 1 is a block diagram of an example wireless local area network (WLAN), according to an embodiment.

FIG. 1 is a block diagram of an example WLAN 110, according to an embodiment. The WLAN 110 includes an access point (AP) 114 that comprises a host processor 118 coupled to a network interface device 122. The network interface 122 includes a medium access control (MAC) processor 126 and a physical layer (PHY) processor 130. The PHY processor 130 includes a plurality of transceivers 134, and the transceivers 134 are coupled to a plurality of antennas 138. Although three transceivers 134 and three antennas 138 are illustrated in FIG. 1, the AP 114 includes other suitable numbers (e.g., 1, 2, 4, 5, etc.) of transceivers 134 and antennas 138 in other embodiments. In some embodiments, the AP 114 includes a higher number of antennas 138 than transceivers 134, and antenna switching techniques are utilized.

The network interface 122 is implemented using one or more integrate circuits (ICs) configured to operate as discussed below. For example, the MAC processor 126 may be implemented, at least partially, on a first IC, and the PHY processor 130 may be implemented, at least partially, on a second IC. As another example, at least a portion of the MAC processor 126 and at least a portion of the PHY processor 130 may be implemented on a single IC. For instance, the network interface 122 may be implemented using a system on a chip (SoC), where the SoC includes at least a portion of the MAC processor 126 and at least a portion of the PHY processor 130.

In an embodiment, the host processor 118 includes a processor configured to execute machine readable instructions stored in a memory device (not shown) such as a random access memory (RAM), a read-only memory (ROM), a flash memory, etc. In an embodiment, the host processor 118 may be implemented, at least partially, on a first IC, and the network device 122 may be implemented, at least partially, on a second IC. As another example, the host processor 118 and at least a portion of the network interface 122 may be implemented on a single IC.

In various embodiments, the MAC processor 126 and/or the PHY processor 130 of the AP 114 are configured to generate data units, and process received data units, that conform to a WLAN communication protocol such as a communication protocol conforming to the IEEE 802.11 Standard or another suitable wireless communication protocol. For example, the MAC processor 126 may be configured to implement MAC layer functions, including MAC layer functions of the WLAN communication protocol, and the PHY processor 130 may be configured to implement PHY functions, including PHY functions of the WLAN communication protocol. For instance, the MAC processor 126 may be configured to generate MAC layer data units such as MAC service data units (MSDUs), MAC protocol data units (MPDUs), etc., and provide the MAC layer data units to the PHY processor 130. The PHY processor 130 may be configured to receive MAC layer data units from the MAC processor 126 and encapsulate the MAC layer data units to generate PHY data units such as PHY protocol data units (PPDUs) for transmission via the antennas 138. Similarly, the PHY processor 130 may be configured to receive PHY data units that were received via the antennas 138, and extract MAC layer data units encapsulated within the PHY data units. The PHY processor 130 may provide the extracted MAC layer data units to the MAC processor 126, which processes the MAC layer data units.

The PHY processor 130 is configured to downconvert one or more radio frequency (RF) signals received via the one or more antennas 138 to one or more baseband analog signals, and convert the analog baseband signal(s) to one or more digital baseband signals, according to an embodiment. The PHY processor 130 is further configured to process the one or more digital baseband signals to demodulate the one or more digital baseband signals and to generate a PPDU. The PHY processor 130 includes amplifiers (e.g., a low noise amplifier (LNA), a power amplifier, etc.), a radio frequency (RF) downconverter, an RF upconverter, a plurality of filters, one or more analog-to-digital converters (ADCs), one or more digital-to-analog converters (DACs), one or more discrete Fourier transform (DFT) calculators (e.g., a fast Fourier transform (FFT) calculator), one or more inverse discrete Fourier transform (IDFT) calculators (e.g., an inverse fast Fourier transform (IFFT) calculator), one or more modulators, one or more demodulators, etc.

The PHY processor 130 is configured to generate one or more RF signals that are provided to the one or more antennas 138. The PHY processor 130 is also configured to receive one or more RF signals from the one or more antennas 138.

The MAC processor 126 is configured to control the PHY processor 130 to generate one or more RF signals by, for example, providing one or more MAC layer data units (e.g., MPDUs) to the PHY processor 130, and optionally providing one or more control signals to the PHY processor 130, according to some embodiments. In an embodiment, the MAC processor 126 includes a processor configured to execute machine readable instructions stored in a memory device (not shown) such as a RAM, a read ROM, a flash memory, etc. In an embodiment, the MAC processor 126 includes a hardware state machine.

The WLAN 110 includes a plurality of client stations 154. Although three client stations 154 are illustrated in FIG. 1, the WLAN 110 includes other suitable numbers (e.g., 1, 2, 4, 5, 6, etc.) of client stations 154 in various embodiments. The client station 154-1 includes a host processor 158 coupled to a network interface device 162. The network interface 162 includes a MAC processor 166 and a PHY processor 170. The PHY processor 170 includes a plurality of transceivers 174, and the transceivers 174 are coupled to a plurality of antennas 178. Although three transceivers 174 and three antennas 178 are illustrated in FIG. 1, the client station 154-1 includes other suitable numbers (e.g., 1, 2, 4, 5, etc.) of transceivers 174 and antennas 178 in other embodiments. In some embodiments, the client station 154-1 includes a higher number of antennas 178 than transceivers 174, and antenna switching techniques are utilized.

The network interface 162 is implemented using one or more ICs configured to operate as discussed below. For example, the MAC processor 166 may be implemented on at least a first IC, and the PHY processor 170 may be implemented on at least a second IC. As another example, at least a portion of the MAC processor 166 and at least a portion of the PHY processor 170 may be implemented on a single IC. For instance, the network interface 162 may be implemented using an SoC, where the SoC includes at least a portion of the MAC processor 166 and at least a portion of the PHY processor 170.

In an embodiment, the host processor 158 includes a processor configured to execute machine readable instructions stored in a memory device (not shown) such as a RAM, a ROM, a flash memory, etc. In an embodiment, the host processor 158 may be implemented, at least partially, on a first IC, and the network device 162 may be implemented, at least partially, on a second IC. As another example, the host processor 158 and at least a portion of the network interface 162 may be implemented on a single IC.

In various embodiments, the MAC processor 166 and the PHY processor 170 of the client device 154-1 are configured to generate data units, and process received data units, that conform to the WLAN communication protocol or another suitable communication protocol. For example, the MAC processor 166 may be configured to implement MAC layer functions, including MAC layer functions of the WLAN communication protocol, and the PHY processor 170 may be configured to implement PHY functions, including PHY functions of the WLAN communication protocol. The MAC processor 166 may be configured to generate MAC layer data units such as MSDUs, MPDUs, etc., and provide the MAC layer data units to the PHY processor 170. The PHY processor 170 may be configured to receive MAC layer data units from the MAC processor 166 and encapsulate the MAC layer data units to generate PHY data units such as PPDUs for transmission via the antennas 178. Similarly, the PHY processor 170 may be configured to receive PHY data units that were received via the antennas 178, and extract MAC layer data units encapsulated within the PHY data units. The PHY processor 170 may provide the extracted MAC layer data units to the MAC processor 166, which processes the MAC layer data units.

The PHY processor 170 is configured to downconvert one or more RF signals received via the one or more antennas 178 to one or more baseband analog signals, and convert the analog baseband signal(s) to one or more digital baseband signals, according to an embodiment. The PHY processor 170 is further configured to process the one or more digital baseband signals to demodulate the one or more digital baseband signals and to generate a PPDU. The PHY processor 170 includes amplifiers (e.g., an LNA, a power amplifier, etc.), an RF downconverter, an RF upconverter, a plurality of filters, one or more ADCs, one or more DACs, one or more DFT calculators (e.g., an FFT calculator), one or more IDFT calculators (e.g., an IFFT calculator), one or more modulators, one or more demodulators, etc.

The PHY processor 170 is configured to generate one or more RF signals that are provided to the one or more antennas 178. The PHY processor 170 is also configured to receive one or more RF signals from the one or more antennas 178.

The MAC processor 166 is configured to control the PHY processor 170 to generate one or more RF signals by, for example, providing one or more MAC layer data units (e.g., MPDUs) to the PHY processor 170, and optionally providing one or more control signals to the PHY processor 170, according to some embodiments. In an embodiment, the MAC processor 166 includes a processor configured to execute machine readable instructions stored in a memory device (not shown) such as a RAM, a ROM, a flash memory, etc. In an embodiment, the MAC processor 166 includes a hardware state machine.

In an embodiment, each of the client stations 154-2 and 154-3 has a structure that is the same as or similar to the client station 154-1. Each of the client stations 154-2 and 154-3 has the same or a different number of transceivers and antennas. For example, the client station 154-2 and/or the client station 154-3 each have only two transceivers and two antennas (not shown), according to an embodiment.

PPDUs are sometimes referred to herein as packets. MPDUs are sometimes referred to herein as frames.

Figure 2A:
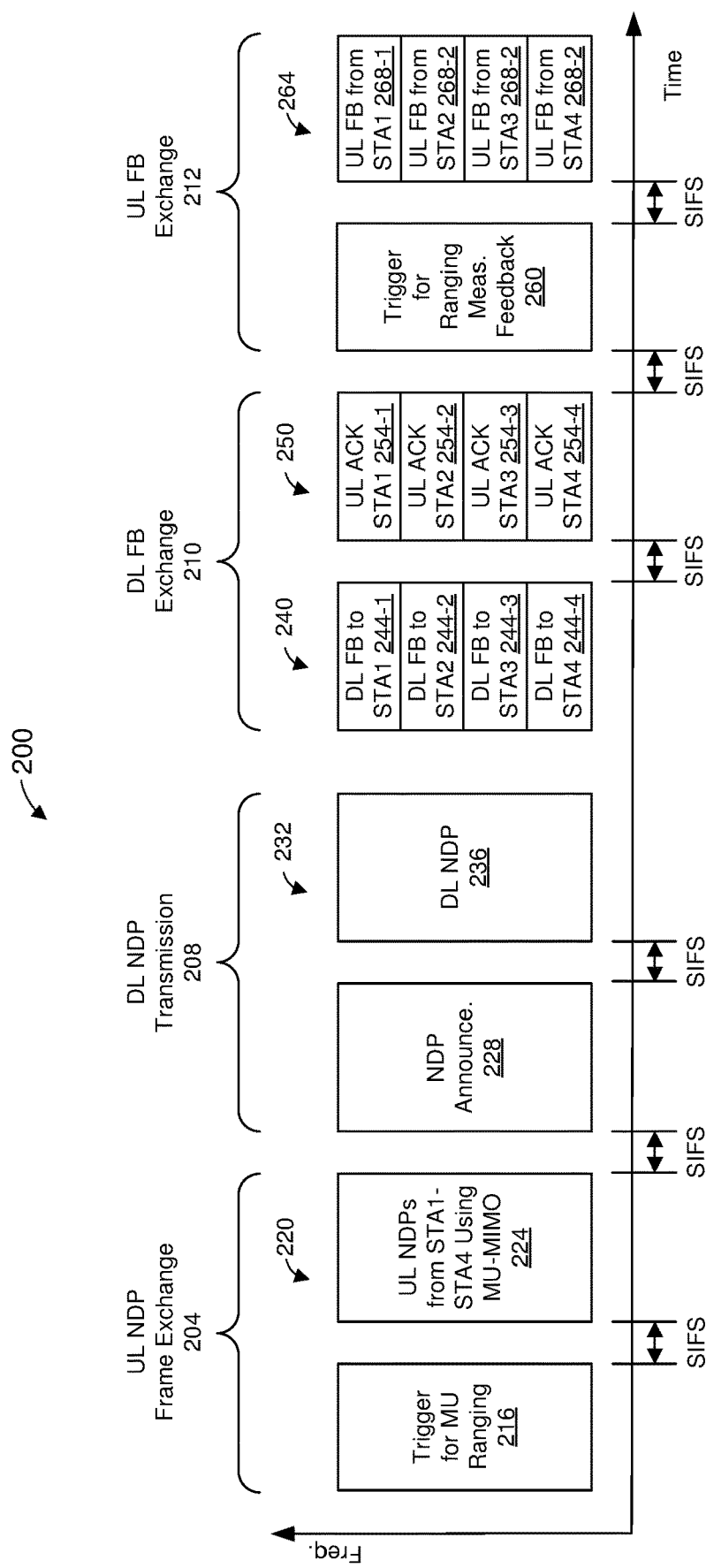
FIG. 2A is a diagram of an example multi-user (MU) ranging measurement exchange in an MU ranging measurement procedure, according to an embodiment.

FIG. 2A is a diagram of an example multi-user (MU) ranging measurement exchange 200 in an MU ranging measurement procedure, according to an embodiment. The diagram 200 is described in the context of the example network 110 merely for explanatory purposes. In some embodiments, signals illustrated in FIG. 2A are generated by other suitable communication devices in other suitable types of wireless networks.

The MU ranging measurement exchange 200 corresponds to an AP-initiated MU ranging measurement exchange, according to an embodiment. The MU ranging measurement exchange 200 includes an uplink (UL) null data packet (NDP) frame exchange 204, a downlink (DL) NDP transmission portion 208, a DL feedback (FB) frame exchange 210, and an UL FB frame exchange 212. In an embodiment, the uplink UL NDP frame exchange 204, the DL NDP transmission portion 208, the DL FB frame exchange 210, and the UL FB frame exchange 212 occur within a single transmit opportunity period (TXOP). In another embodiment, the uplink UL NDP frame exchange 204, the DL NDP transmission portion 208, the DL FB frame exchange 210, and the UL FB frame exchange 212 do not occur within a single TXOP. For example, the uplink UL NDP frame exchange 204 and the DL NDP transmission portion 208 occur within a single TXOP, whereas the DL FB frame exchange 210 and the UL FB frame exchange 212 occur after the single TXOP (e.g., in another TXOP or in multiple other TXOPs).

In the UL NDP exchange 204, a first communication device (e.g., the AP 114) transmits a DL PPDU 216 that includes a trigger frame to cause a group of multiple second communication devices (e.g., client stations 154) to simultaneously transmit, as part of an uplink (UL) MU transmission 220, UL null data packets (NDPs) 224. In an embodiment, the trigger frame in the PPDU 216 is a type of trigger frame specifically for initiating an MU ranging measurement exchange such as the MU ranging measurement exchange 200. The trigger frame in the PPDU 216 causes multiple client stations 154 to begin simultaneously transmitting the UL MU transmission 220 a defined time period after an end of the PPDU 216. In an embodiment, the defined time period is a short interframe space (SIFS) as defined by the IEEE 802.11 Standard. In other embodiments, another suitable time period is utilized.

In an embodiment, the UL MU transmission 220 includes an UL MU multiple input, multiple output (MIMO) transmission having two or more UL NDPs 224 from multiple client stations 154, e.g., STA1, STA2, STA3, and STA4. The two or more of the UL NDPs 224 are transmitted within a same frequency band via different spatial streams (e.g., MU-MIMO). In another embodiment, the UL MU transmission 220 includes an UL orthogonal frequency division multiple access (OFDMA) transmission having two or more UL NDPs 224 from multiple client stations 154, e.g., STA1, STA2, STA3, and STA4, in different respective frequency bandwidth portions. In yet another embodiment, three or more UL NDP packets 224 transmitted using a combination of UL MU-MIMO and UL OFDMA, where at least two NDPs are transmitted using MU-MIMO in a same frequency bandwidth portion via different spatial streams, and at least one NDP is transmitted in at least one other different frequency bandwidth portion. The UL NDPs 224 include PHY preambles having one or more short training fields (STFs), one or more long training fields (LTFs) and one or more signal fields, in an embodiment. The UL NDPs 224 omit data portions.

When transmitting the UL NDPs 224, each client station 154 records a time $t_{1,k}$ at which the client station 154 began transmitting the UL NDP 224, where k is an index indicating the particular client station 154. Similarly, when the AP 114 receives each UL NDP 224, the AP 114 records a time $t_{2,k}$ at which the AP 114 began receiving the UL NDP 224.

In some embodiments, when transmitting the UL NDPs 224, each of at least some of the client stations 154 (e.g., client stations 154 with multiple antennas 174) records an angle of departure, $AoD_{1,k}$, at which the UL NDP 224 left the antennas 178 of the client station 154. Similarly, when the AP 114 receives each UL NDP 224, the AP 114 records an angle of arrival, $AoA_{1,k}$, at which the UL NDP 224 arrived at the antennas 138 of the AP 114.

Figure 2B:
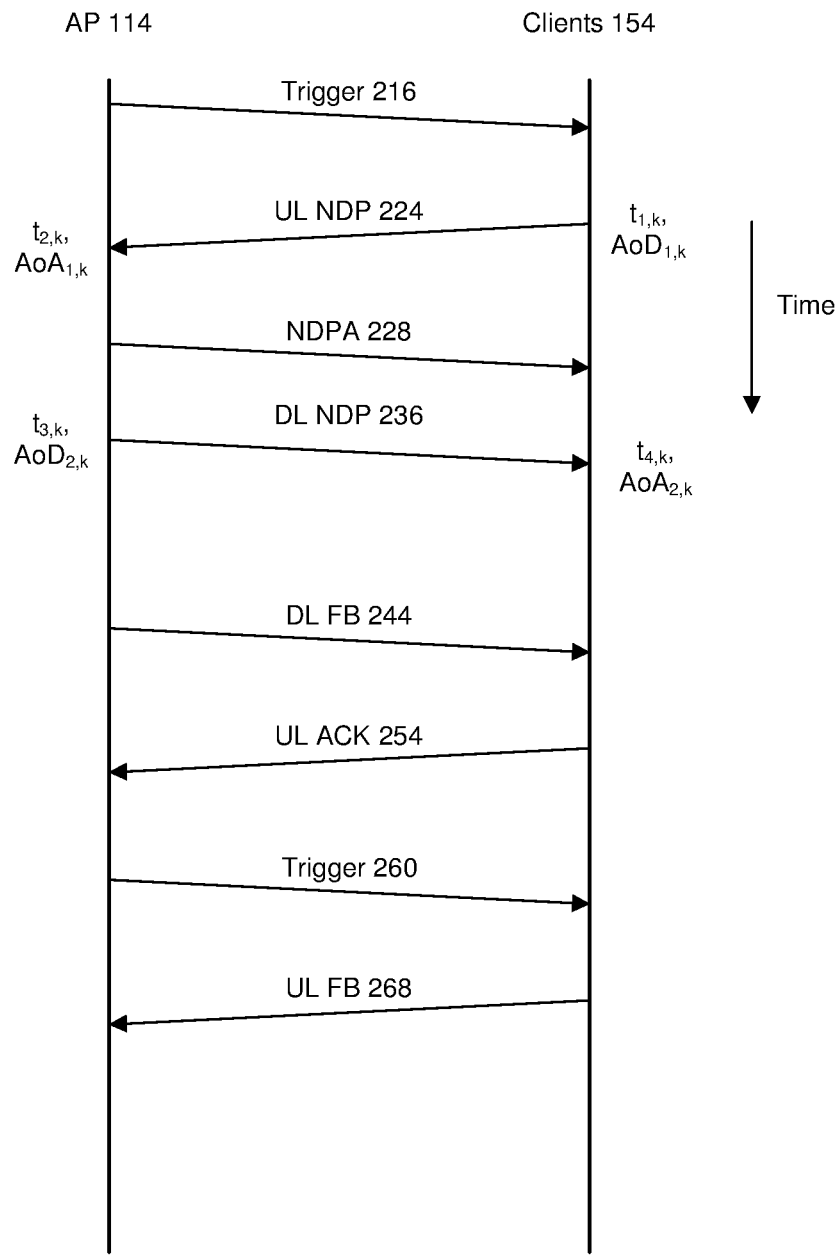
FIG. 2B is a timing diagram of the example MU ranging measurement exchange of FIG. 2A, according to an embodiment.

FIG. 2B is a timing diagram of the example MU ranging measurement exchange 200 of FIG. 2A. As illustrated in FIG. 2B, each client station 154 records the time $t_{1,k}$ at which the client station 154 began transmitting the UL NDP 224, and records the $AoD_{1,k}$ at which the UL NDP 224 left the antennas 178 of the client station 154. Additionally, the AP 114 records the time $t_{2,k}$ at which the AP 114 began receiving each UL NDP 224, and the $AoA_{1,k}$ at which each UL NDP 224 arrived at the antennas 138 of the AP 114.

Referring now to FIGS. 2A and 2B, responsive to the UL MU transmission 220, the AP 114 begins transmitting a DL PPDU 228 that includes an NDP announcement (NDPA) frame a defined time period after an end of the UL MU transmission 220. In an embodiment, the defined time period is SIFS. In other embodiments, another suitable time period is utilized. The NDPA frame in the PPDU 228 is configured to cause the client stations 154 to be prepared to receive an NDP from the AP 114, according to an embodiment.

The AP 114 generates a DL PPDU 232 and begins transmitting the DL PPDU 232 a defined time period after an end of the DL PPDU 228. In an embodiment, the defined time period is SIFS. In other embodiments, another suitable time period is utilized. The DL PPDU 232 is a MU PPDU that includes DL NDPs 236 to respective client stations 154. In another embodiment, the AP 114 transmits a single DL NDP 236 using a SU DL transmission (e.g., the NDP Announcement frame 228 announces to all receivers that the DL NDP 236 is following) to the client stations 154. The DL NDP(s) 236 include PHY preamble(s) having one or more STFs, one or more LTFs and one or more signal fields, in an embodiment. The DL NDP(s) 236 omit data portions. In an embodiment, different DL NDPs 236 are transmitted in different frequency bandwidth portions (e.g., OFDMA). In some embodiments, two or more of the DL NDPs 236 are transmitted within a same frequency band (e.g., two or more of the DL NDPs 236 span the same frequency band) using different spatial streams (e.g., the two or more DL NDPs 236 are transmitted using MU-MIMO). In another embodiment, a single DL NDP 236 is broadcast to the client stations 154.

When transmitting the DL NDP(s) 236, the AP 114 records a time $t_{3,k}$ at which the AP 114 began transmitting the DL NDP(s) 236. Similarly, when each client station 154 receives the corresponding DL NDP 236, the client station 154 records a time $t_{4,k}$ at which the client station 154 began receiving the DL NDP 236. As illustrated in FIG. 2B, the AP 114 records the time $t_{3,k}$ at which the AP 114 began transmitting the DL NDP 236, and the client station 154 records the time $t_{4,k}$ at which the client station 154 began receiving the DL NDP 236.

In some embodiments, when transmitting the DL NDP 236, the AP 114 records an $AoD_{2,k}$ at which the DL NDP 236 left the antennas 138 of the AP 114. Similarly, when the client station 154 receives the DL NDP 236, the client station 154 records an $AoA_{2,k}$ at which the DL NDP 236 arrived at the antennas 178 of the client station 154.

In some embodiments, the MU ranging measurement exchange 200 omits the DL PPDU 228. For example, the AP 114 begins transmitting the DL PPDU 232 a defined time period after an end of the UL MU transmission 220. In an embodiment, the defined time period is SIFS. In other embodiments, another suitable time period is utilized.

The DL FB exchange 210 includes a DL PPDU 240 (which may be a DL OFDMA transmission or a DL MU-MIMO transmission) having FB frames 244 for multiple client stations 154, e.g., STA1, STA2, STA3, and STA4. The FB frames 244 are illustrated in FIG. 2A as being transmitted in different frequency bandwidth portions. In some embodiments, two or more of the FB frames 244 are transmitted within a same frequency band (e.g., two or more of the FB frames 244 span the same frequency band) using different spatial streams (e.g., the two or more FB frames 244 are transmitted using MU-MIMO).

In some embodiments, the DL PPDU 240 is transmitted a defined time period after an end of the DL PPDU 232. In an embodiment, the defined time period is SIFS. In other embodiments, another suitable time period is utilized. In other embodiments, the DL PPDU 240 is transmitted after some delay. As discussed above, in some embodiments, the DL PPDU 240 is not transmitted within a same TXOP as the DL PPDU 232.

The FB frames 244 respectively include the recorded times $t_{2,k}$ and $t_{3,k}$. In some embodiments, each of one or more FB frames 244 respectively includes (optionally) the recorded angles $AoA_{1,k}$ and $AoD_{2,k}$. In some embodiments, the FB frames 244 optionally also include respective channel estimate information determined by the AP 114 based on reception of the UL NDPs 224.

After receipt of the FB frames 244, one or more of the client stations 154 respectively calculate one or more respective of times-of-flight between the AP 114 and the one or more client stations 154 using the recorded times $t_{1,k}$, $t_{2,k}$, $t_{3,k}$, and $t_{4,k}$, according to an embodiment. Any suitable technique, including currently known techniques, may be utilized to calculate a time-of-flight using the recorded times $t_{1,k}$, $t_{2,k}$, $t_{3,k}$, and $t_{4,k}$. Respective distances between the AP 114 and the client stations 154 may be calculated using the calculated times-of-flight, e.g., by respectively multiplying the times-of-flight by the speed of light, according to an embodiment.

In some embodiments, one or more of the client stations 154 calculates estimated positions of one or more of the client stations using the calculated times-of-flight. For example, the client station 154-1 uses triangulation techniques to calculate an estimated positions of the client station 154-1 using the calculated time-of-flight. In some embodiments, the client station 154-1 calculates an estimated position of the client station also using the recorded angles $AoD_{1,k}$, $AoA_{1,k}$, $AoD_{2,k}$, and $AoA_{2,k}$. For example, the recorded angles $AoD_{1,k}$, $AoA_{1,k}$, $AoD_{2,k}$, and $AoA_{2,k}$ are used as part of a triangulation algorithm for determining a position of the client station 154-1.

Responsive to receipt of the FB frames 244, the client stations 154 generate an UL MU transmission 250 (which may be an UL OFDMA transmission or an UL MU MIMO transmission) that includes respective ACK frames 254 from respective client stations, according to an embodiment. The client stations 154 transmit as part of the UL MU transmission 250 a defined time period after an end of the DL transmission 240. In an embodiment, the defined time period is SIFS. In other embodiments, another suitable time period is utilized. The ACK frames 254 are illustrated in FIG. 2A as being transmitted in different frequency bandwidth portions. In some embodiments, two or more of the ACK frames 254 are transmitted within a same frequency band (e.g., two or more of the ACK frames 254 span the same frequency band) using different spatial streams (e.g., the two or more ACK frames 254 are transmitted using MU-MIMO). In some embodiments, the client stations 154 do not generate and transmit the UL MU transmission 250 (e.g., the client stations 154 do not generate and transmit the AC frames 254).

In an embodiment, the AP 114 transmits a DL PPDU 260 a defined time period after an end of the UL MU transmission 250. In an embodiment, the defined time period is SIFS. In other embodiments, another suitable time period is utilized. The PPDU 260 includes a trigger frame to cause the group of client stations 154 to simultaneously transmit, as part of an UL MU transmission 264, uplink PPDUs 268 that include ranging measurement feedback. The trigger frame in the PPDU 260 causes multiple client stations 154 to begin simultaneously transmitting the UL MU transmission 264 a defined time period after an end of the PPDU 260. In an embodiment, the defined time period is SIFS. In other embodiments, another suitable time period is utilized.

The UL MU transmission 264 (which may be an UL OFDMA transmission or an UL MU-MIMO transmission) includes UL PPDUs 268 from multiple client stations 154, e.g., STA1, STA2, STA3, and STA4. The UL PPDUs 268 are illustrated in FIG. 2A as being transmitted in different frequency bandwidth portions. In some embodiments, two or more of the UL PPDUs 268 are transmitted within a same frequency band (e.g., two or more of the UL PPDUs 268 span the same frequency band) using different spatial streams (e.g., the two or more UL PPDUs 268 are transmitted using MU-MIMO).

The UL PPDUs 268 correspond to uplink ranging measurement feedback packets. The PPDUs 268 respectively include the recorded times $t_{1,k}$ and $t_{4,k}$. In some embodiments, each of one or more PPDUs 268 respectively includes (optionally) the recorded angles $AoD_{1,k}$ and $AoA_{2,k}$. In some embodiments, the PPDUs 268 optionally also include respective channel estimate information determined by the client station 154 based on reception of the DL NDP 236.

In an embodiment, the AP 114 transmits an acknowledgement to the client stations 154 after receiving the UL MU transmission 264. In other embodiments, however, the AP 114 does not transmit an acknowledgement after receiving the UL MU transmission 264. In an embodiment, an indication in the DL PPDU 260 indicates whether or not the AP 114 will transmit an acknowledgement to the client stations 154 after receiving the UL MU transmission 264.

After receipt of the PPDUs 268, the AP 114 calculates respective of times-of-flight between the AP 114 and the client stations 154 using the recorded times $t_{1,k}$, $t_{2,k}$, $t_{3,k}$, and $t_{4,k}$, according to an embodiment. Any suitable technique, including currently known techniques, may be utilized to calculate a time-of-flight using the recorded times $t_{1,k}$, $t_{2,k}$, $t_{3,k}$, and $t_{4,k}$. Respective distances between the AP 114 and the client stations 154 may be calculated using the calculated times-of-flight, e.g., by respectively multiplying the times-of-flight by the speed of light, according to an embodiment.

In some embodiments, the AP 114 calculates estimated positions of one or more of the client stations using the calculated times-of-flight. For example, the AP 114 uses triangulation techniques to calculate estimated positions of one or more of the client stations using the calculated times-of-flight. In some embodiments, the AP 114 calculates estimated positions of one or more of the client stations also using the recorded angles $AoD_{1,k}$, $AoA_{1,k}$, $AoD_{2,k}$, and $AoA_{2,k}$. For example, the recorded angles $AoD_{1,k}$, $AoA_{1,k}$, $AoD_{2,k}$, and $AoA_{2,k}$ are used as part of a triangulation algorithm for determining positions of communication devices.

In another embodiment, the order, in time, of the DL FB exchange 210 and the UL FB exchange 212 is reversed, and the UL FB exchange 212 occurs before the DL FB exchange 210. In some embodiments, the DL FB exchange 210 is omitted. In some embodiments, the UL FB exchange 212 is omitted.

Figure 3A:
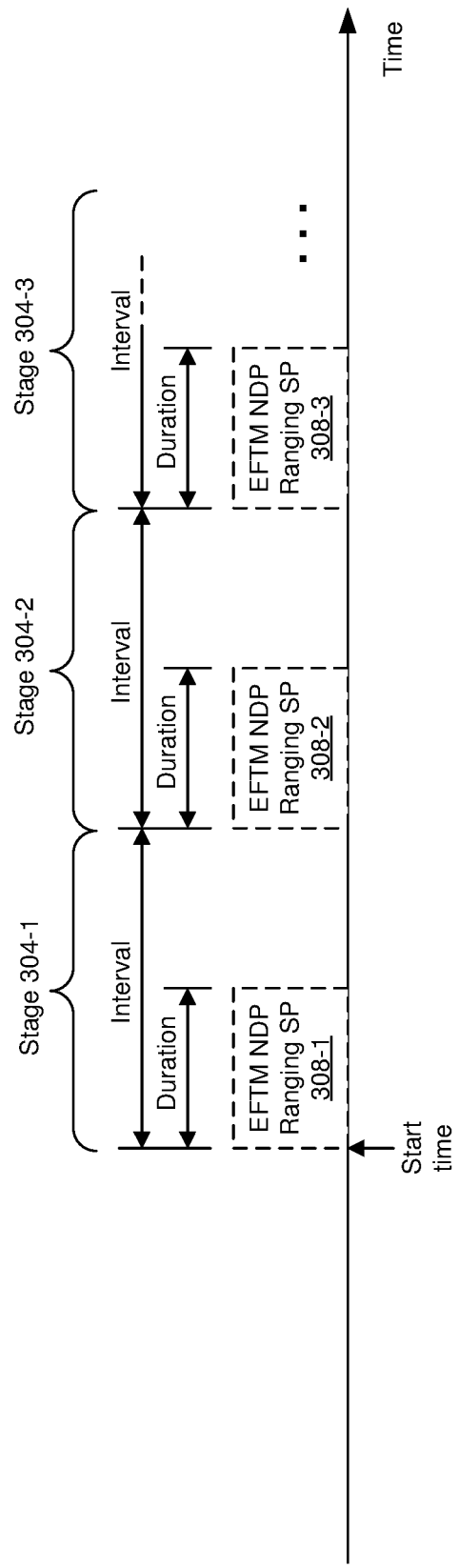
FIG. 3A is a timing diagram of an example MU ranging measurement procedure, according to an embodiment.

FIG. 3A is a timing diagram of an example MU ranging measurement procedure 300, according to an embodiment. The diagram of FIG. 3A is described in the context of the example network 110 merely for explanatory purposes. In some embodiments, signals illustrated in FIG. 3A are generated by other suitable communication devices in other suitable types of wireless networks.

The MU ranging measurement procedure 300 begins at a start time and includes a plurality of stages 304. In an embodiment, the AP 114 performs one or more MU ranging measurement exchanges (e.g., the MU ranging measurement exchange 200 of FIG. 2A or another suitable MU ranging measurement exchange) with different sets of client stations 154 in the stages 304. Each stage 304 includes a time slot 308 (sometimes referred to herein as an enhanced fine timing measurement (EFTM) service period (SP)). In an embodiment, a first time slot 308-1 begins at the start time of the MU ranging measurement procedure 300. The time slots 308 occur at an interval.

Figure 3B:
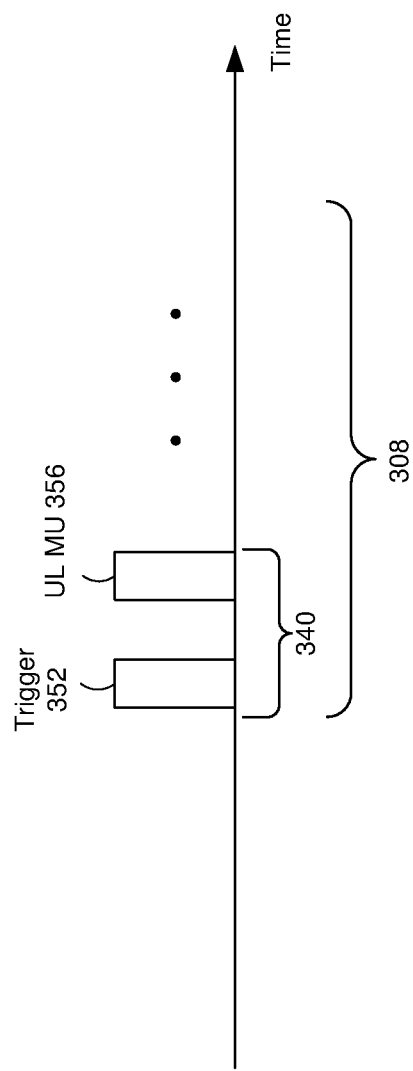
FIG. 3B is a timing diagram of a portion of an example MU ranging measurement procedure, according to an embodiment.

In an embodiment, the AP 114 transmits a trigger frame to determine the readiness of a plurality of client stations 154 to participate in an MU ranging measurement procedure prior to initiating an MU ranging measurement exchange. In an embodiment, a trigger frame to determine the readiness of client stations 154 is transmitted in each time slot 308. FIG. 3B is a timing diagram 330 showing an example transmission exchange 340 within a portion of the time slot 308 to determine the readiness of client stations 154. In other embodiment, however, the transmission exchange 340 occurs outside of the time slot 308.

The AP 114 generates and transmits a DL PPDU 352 to the client stations 154 to poll the client stations 154 and determine readiness of the client stations 154 to participate in the MU ranging measurement procedure 300. In an embodiment, the DL PPDU 352 includes a trigger frame. In an embodiment, the trigger frame in the DL PPDU 352 is a type of trigger frame specifically for polling the client stations 154 to determine the readiness. In an embodiment, the trigger frame in the DL PPDU 352 includes information that indicates that the trigger frame is for an MU ranging measurement procedure and further indicates that the trigger frame is for prompting the client stations to transmit, to the AP 114, respective ranging measurement readiness packets indicative of readiness of the respective client stations 154 to participate in the MU ranging measurement procedure.

In response to the reception of the trigger frame in the DL PPDU 352, each of the client stations 154 determines its readiness to participate in the MU ranging measurement procedure with the AP 114. In an embodiment, a client station 154 determines that it is ready to participate in the MU ranging measurement procedure with the AP 114 if it is not currently communicating with any other communication device (e.g., a communication device different from the AP 114). If a client station 154 determines that it is ready to participate in the MU ranging measurement procedure, the client station 154 transmits a packet indicative of its readiness to participate in the MU ranging measurement procedure as part of an UL MU transmission 356 to the AP 114 in conjunction with one or more other client stations 154. In an embodiment, the UL MU transmission 356 is an UL OFDMA transmission and/or an UL MU-MIMO transmission that includes respective ranging measurement readiness packets from a plurality of client stations 154 that are ready to participate in the MU ranging measurement procedure. In various embodiments, the ranging measurement readiness packets transmitted by the client stations 154 include one or more of a quality of service (QoS) null frame, an enhanced fine timing measurement (EFTM) request frame, a power save (PS) poll frame, etc. In another embodiment, the ranging measurement readiness packets transmitted by the client stations 154 are NDPs.

Based on the reception of the UL MU transmission 356, the AP 114 determines client stations 154 that are ready to participate in the MU ranging measurement procedure. For instance, in an embodiment, the AP 114 determines a group of client stations 154 from among the plurality of client stations 154 that transmitted respective ranging measurement readiness packets in the UL MU transmission 356. In an embodiment, the AP 114 determines that a client station 154 is ready to participate in an MU ranging measurement exchange if a corresponding ranging measurement readiness packet transmitted by the client station 154 is received by the AP 114.

In an embodiment, the AP 114 transmits a trigger frame to prompt a plurality of client stations 154 to transmit respective requests for participation in an MU ranging measurement procedure. FIG. 4A is a timing diagram of an example transmission exchange 400 between an AP 114 and a plurality of client stations 154. The diagram of FIG. 4A is described in the context of the example network 110 merely for explanatory purposes. In some embodiments, signals illustrated in FIG. 4A are generated by other suitable communication devices in other suitable types of wireless networks.

The AP 114 generates and transmits a DL PPDU 404 having a trigger frame configured to prompt a plurality of client stations 154 to transmit, as part of an UL MU transmission 408 (e.g., an UL OFDMA transmission and/or an UL MU-MIMO transmission), respective ranging measurement request packets indicative of respective requests for participation in the MU ranging measurement procedure. In an embodiment, the trigger frame in the DL PPDU 404 is a type of trigger frame specifically for prompting the client stations 154 to transmit, to the AP 114, respective ranging measurement request packets. In an embodiment, the trigger frame in the DL PPDU 404 includes information that indicates that the trigger frame is for an MU ranging measurement procedure and further indicates that the trigger frame is for prompting the client stations to transmit, to the AP 114, respective ranging measurement request packets.

In response to the DL PPDU 404, at least some of the plurality of client stations 154 simultaneously transmit, as part of the UL MU transmission 408 (e.g., an UL OFDMA transmission and/or an UL MU-MIMO transmission) to the AP 114, respective ranging measurement request packets. For instance, at least some of the plurality of client stations 154 require a ranging measurement procedure and respond to the DL PPDU 404 by transmitting respective ranging measurement request packets.

In an embodiment, based on the UL MU transmission 408, the AP 114 determines a group of client stations 154 to participate in the MU ranging measurement procedure. For instance, in an embodiment, the AP 114 determines the group of client stations 154, from among the plurality of client stations 154, that transmitted respective ranging measurement request packets. The AP 114 and the group of client stations 154 then perform the MU ranging measurement procedure, such as the ranging measurement procedure 300 as described above with respect to FIG. 3, in an embodiment. In some embodiments, the time between the end of the transmission exchange 400 and the beginning of the ranging measurement procedure 300 is SIFS. In other embodiments, the time between the end of the transmission exchange 400 and the beginning of the ranging measurement procedure 300 is different from SIFS.

In an embodiment, an AP 114 is unaware of the client stations 154 that are present within a transmission range of the AP 114 and that may potentially be requiring ranging measurement procedures. In one such embodiment, the AP 114 transmits a first trigger frame in order to determine client stations 154 that are present within the transmission range of the AP 114 prior to transmitting a second trigger frame that prompts at least some of the determined client stations 154 to transmit respective requests for participation in the MU ranging measurement procedure. FIG. 4B is a timing diagram of an example transmission exchange 450 between an AP 114 and a plurality of client stations 154. The transmission exchange 450 is similar to the transmission exchange 400 described above and like-numbered elements are not discussed in detail for reasons of brevity. In an embodiment, the AP 114 initiates the transmission exchange 450 when performing MU ranging measurements with client stations 154 that are not necessarily associated with the AP 114 and/or are unknown to the AP 114.

The AP 114 generates and transmits a DL PPDU 454 having a first trigger frame configured to prompt a plurality of client stations 154 to transmit, as part of an UL MU NDP transmission 458 (e.g., an UL OFDMA transmission and/or an UL MU-MIMO transmission), respective NDPs. In an embodiment, the trigger frame in the DL PPDU 454 includes information that indicates that the trigger frame is for an MU ranging measurement procedure and further indicates that the trigger frame is for prompting the client stations 154 to transmit, to the AP 114, respective NDPs in order to indicate presence of the respective client stations 154. In an embodiment, the trigger frame in the DL PPDU 454 is a broadcast frame.

In response to the DL PPDU 454, the client stations 154 simultaneously transmit, as part of the UL MU transmission 458 (e.g., an UL OFDMA transmission and/or an UL MU-MIMO transmission) to the AP 114, respective NDPs to indicate presence of the respective client stations 154. In an embodiment, the respective NDPs transmitted by the respective client stations 154 are "short" NDPs that do not include any MPDUs. In an embodiment, the respective NDPs transmitted by the respective client stations 154 are a type of NDP that is not utilized at the AP 114 for channel sounding and/or for a ranging measurement.

Based on the reception of the UL MU transmission 458, the AP 114 determines the client stations 154 that are present within its transmission range. For instance, the AP 114 determines a client station 154 as present within its transmission range if a corresponding NDP from the client station 154 was received in the UL MU transmission 458. The AP 114 then transmits a DL PPDU 404 having a trigger frame configured to prompt at least some of the determined client stations 154 to transmit, as part of an UL MU transmission 408, respective ranging measurement request packets indicative of respective requests for participation in the MU ranging measurement procedure.

Figure 5:
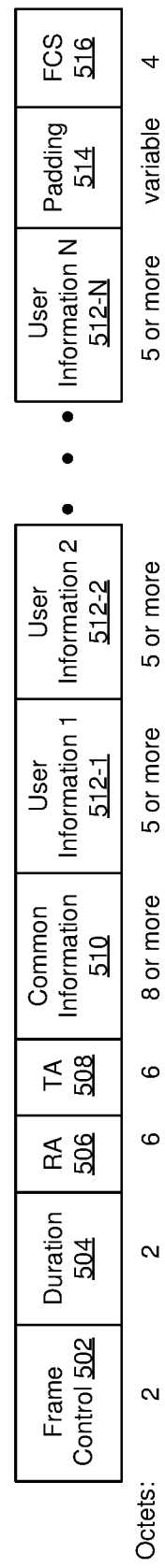
FIG. 5 is an example frame format of a trigger frame, according to an embodiment.

FIG. 5 is a diagram of an example frame format of a trigger frame 500 for use in an MU transmission exchange between an AP 114 and client stations 154, according to an embodiment. In an embodiment, the trigger frame 500 is used to solicit an UL MU transmission from client stations 154. In various embodiments, the trigger frame 500 is a trigger frame included in one or more of the DL PPDU 216 (FIG. 2A), DL PPDU 260 (FIG. 2A), DL PPDU 352 (FIG. 3B), DL PPDU 404 (FIG. 4A), and/or DL PPDU 454 (FIG. 4B). In an embodiment, the trigger frame 500 is generated by the MAC processor 126 of the network interface 122. FIG. 5 indicates example lengths (e.g., in terms of octets) of fields of the trigger frame 500. In other embodiments, length(s) one or more of the fields has another suitable number length(s). In some embodiments, one or more of the fields are omitted and/or one or more additional fields are included in the trigger frame 500.

The trigger frame 500 includes a frame control field 502, a duration field 504, a receiver address (RA) field 506, a transmitter address (TA) field 508, a common information field 510, one or more user information fields 512, a padding field 514, and a frame check sequence (FCS) field 516.

The frame control field 502 includes information that indicates that frame 500 is a trigger frame configured to prompt a plurality of other communication devices (e.g., multiple client stations 154) to simultaneously transmit as part of an UL MU transmission (e.g., OFDMA and/or MU-MIMO). The duration field 504 includes information that indicates a length of a transmit opportunity period (TXOP) during which the MU transmission exchange will take place, in an embodiment. The RA field 506 includes an address corresponding to the multiple client stations 154 that are the target recipients of the trigger frame 500. For instance, the RA field 506 indicates a broadcast address or a multicast address corresponding to the multiple client stations 154, in various embodiments. The TA field 508 includes an address corresponding to the AP 114 transmitting the trigger frame 500. The common information field 510 includes information that is common to the multiple client stations 154. Each of the user information fields 512 includes information specific to a corresponding client station 154. For instance, in an embodiment, the user information field 1 512-1 indicates information specific to client station 154-1, the user information field 2 512-2 indicates information specific to client station 154-2, etc. The padding field 514 includes padding bits for the trigger frame 500, if any. Padding bits are included in the padding field 514 to give STAs more time to prepare the UL MU transmission. The FCS field 516 includes an error detecting code that enables a receiving device to determine whether the trigger frame 500 was received without any errors.

FIG. 6A is a diagram of an example format of a common information field 600 included in the trigger frame 500 of FIG. 5. For example, the common information field 600 corresponds to the common information field 510 (FIG. 5). FIG. 6A indicates example lengths (e.g., in bits) of subfields of the common information field 600. In other embodiments, one or more of the subfields has another suitable length. In some embodiments, one or more of the subfields are omitted and/or one or more additional subfields are included in the common information field 600.

The common information field 600 includes a trigger type subfield 602, a length subfield 604, a cascade indication subfield 606, a carrier sense (CS) required subfield 608, a bandwidth (BW) subfield 610, a guard interval (GI) and long training field (LTF) type subfield 612, an MU-MIMO LTF mode subfield 614, a number of high efficiency long training field (HE-LTF) symbols subfield 616, a space-time block coding (STBC) subfield 618, a low density parity check (LDPC) extra symbol segment subfield 620, an AP transmit power subfield 622, a packet extension subfield 624, a spatial reuse subfield 626, a Doppler subfield 628, a high efficiency signal-A (HE-SIG-A) reserved subfield 630, a reserved subfield 632, and a trigger dependent common information subfield 634. In an embodiment, the trigger dependent common information subfield 634 is omitted from the common information field 610.

Referring now to FIGS. 5 and 6A, different variants of trigger frame 500 correspond to different types of information that are to be solicited from client stations 154 in an UL MU transmission and/or correspond to different types of MU frame exchange procedures. The trigger type subfield 602 includes a value indicating a variant of the trigger frame 500. In an embodiment, the value of the trigger type subfield 602 is selected from among a plurality of values corresponding to a plurality of trigger frame variants defined by a communication protocol (e.g., the IEEE 802.11 Standard). In an embodiment, the plurality of trigger values further includes one or more values corresponding to one or more trigger frame variants as utilized in MU ranging measurement procedures of FIGS. 2A, 2B, 3A, 3B, 4A, and 4B (e.g., trigger frames in DL PPDU 216, DL PPDU 260, DL PPDU 352, DL PPDU 404, and/or DL PPDU 454).

In an illustrative embodiment, the plurality of trigger frame variants includes any suitable combination of two or more of the following: i) a basic trigger for soliciting an UL MU transmission having basic user data, ii) a beamforming report poll (BRP) trigger for soliciting an UL MU transmission having beamforming training feedback, iii) an MU block acknowledgement request (MU-BAR) trigger for soliciting an UL MU transmission having block acknowledgements, iv) an MU request-to-send (MU-RTS) trigger for soliciting an UL MU transmission having clear-to-send (CTS) frames, v) a buffer status report poll (BSRP) trigger for soliciting an UL MU transmission having information regarding how much user data is buffered at client stations 154 for transmission to the AP 114, vi) a bandwidth query report poll (BQRP) trigger for soliciting an UL MU transmission having bandwidth query reports indicative of channel bandwidth availabilities at client stations 154, vii) an NDP feedback report poll (NFRP) trigger for soliciting an UL MU transmission having NDPs as feedback (e.g., trigger frame in PPDU 454), viii) a trigger for soliciting an UL MU transmission having ranging measurement readiness packets for an MU ranging measurement procedure (e.g., trigger frame in PPDU 352), ix) a trigger for soliciting an UL MU transmission having ranging measurement request packets for an MU ranging measurement procedure (e.g., trigger frame in PPDU 404), x) a trigger for soliciting an UL MU transmission having NDPs for an MU ranging measurement procedure (e.g., trigger frame in PPDU 216), xi) a trigger for soliciting an UL MU transmission having ranging measurement feedback packets for an MU ranging measurement procedure (e.g., trigger frame in PPDU 260), etc.

The length subfield 604 includes a value indicating a length of packets (e.g., PPDUs, NDPs, etc.) to be transmitted in the UL MU transmission responsive to the trigger frame 500. In an embodiment, the value of the length subfield 604 corresponds to a value that client stations 154 will include in a legacy signal (L-SIG) field included in packets that will be transmitted by multiple client stations 154 responsive to the trigger frame 500. The cascade indication subfield 606 includes a value indicating whether the AP will transmit another trigger frame after the UL MU transmission. The CS required subfield 608 includes a value indicating whether the client stations 154 are required to use energy detection (ED) methods and the network allocation vector (NAV) to sense the medium and to determine whether to transmit in response to the trigger frame. The BW subfield 610 includes a value indicating a bandwidth corresponding to the UL MU transmission. The GI and LTF subfield 612 includes a value indicating i) a GI duration to be used for generating OFDM symbols corresponding to the UL MU transmission, and ii) parameters corresponding to the generation of LTF fields to be included the UL MU transmission. The MU-MIMO LTF mode subfield 614 includes a value indicating an LTF mode (e.g., single stream pilot HE-LTF mode or masked HE-LTF sequence mode) of the UL MU transmission. The number of HE-LTF symbols subfield 616 includes a value indicating the number of HE-LTF symbols to be included in UL MU transmission. The STBC subfield 618 includes a value indicating whether STBC is to be used in the UL MU transmission responsive to the trigger frame 500. The LDPC extra symbol segment 620 includes a value indicating whether an extra OFDM symbol is to be included for LDPC in the UL MU transmission. The AP transmit power subfield 622 includes a value indicating a combined average power per 20 MHz bandwidth of all transmit antennas used to transmit the trigger frame from the AP 114. The packet extension subfield 624 includes a value indicating a duration of PPDU extension (PE) fields to be added by the client stations 154 at the end of the UL MU transmission. The spatial reuse subfield 626 includes a value indicating whether or not spatial reuse techniques, that allow early identification of signals from overlapping BSSs, are allowed for the UL MU transmission. The value included in the Doppler subfield 628 is used in conjunction with the number of HE-LTF symbols subfield 616 to indicate the number of HE-LTF symbols to be included in UL MU transmission. The HE-SIG-A reserved subfield 630 includes a value indicating values to which the client stations 154 should set reserved bits in the HE-SIG-A2 subfield of the UL MU transmission. The subfield 632 is reserved, in an embodiment.

Depending on the variant of the trigger frame 500 (e.g., as specified in the trigger type subfield 602) the trigger dependent common information subfield 634 is optionally present in the common information field 600. If present, the format of the trigger dependent common information subfield 634 is dependent on the variant of the trigger frame 500, in at least some embodiments. Further, in an embodiment, one or more of the subfield 618, the subfield 620, the subfield 624, and/or the subfield 628 are reserved based on the variant of the trigger frame 500. For instance, when the trigger frame 500 is for soliciting an UL MU transmission having respective NDPs from respective client stations 154 for an MU ranging measurement procedure, subfield 618, subfield 620, subfield 624, and subfield 628 are reserved from use and the trigger dependent common information subfield 634 is not present, in an embodiment.

In an embodiment, the trigger type subfield 602 is not configured to include separate values to indicate each of the trigger variants corresponding to MU ranging measurement procedures. For instance, the trigger type subfield 602 may include a value indicating that the trigger frame 500 is a trigger corresponding to MU ranging measurement procedures, and an indication in the trigger dependent common information subfield 634 further specifies a particular trigger frame variant among a plurality of trigger frame variants corresponding to MU ranging measurement procedures.

FIG. 6B is a diagram of an example format of a trigger dependent common information subfield 640 of a common information field 600. In an embodiment, the trigger dependent common information field 640 is included in the common information field 600 (e.g., the trigger dependent common information subfield 640 corresponds to the trigger dependent common information subfield 634 of FIG. 6A) when the trigger frame 500 is a trigger corresponding to an MU ranging measurement procedure, in an embodiment. For example, the trigger dependent common information field 640 is included when the trigger type field 602 includes a value indicating that the trigger frame 500 is a trigger corresponding to an MU ranging measurement procedure.

FIG. 6B also indicates example lengths (e.g., in bits) of subfields of the trigger dependent common information field 640. In other embodiments, one or more of the subfields has another suitable length(s). In some embodiments, a subfield is omitted and/or one or more additional subfields are included in the trigger dependent common information field 640.

The value of the trigger subtype subfield 636 is selected from among a plurality of values corresponding to a plurality of trigger frame variants such as utilized in MU ranging measurement procedures described above (e.g., two or more trigger frames in DL PPDU 216, DL PPDU 260, DL PPDU 512, DL PPDU 404, and/or DL PPDU 454, and/or other suitable trigger frames used in MU ranging measurement procedures). In an embodiment, the plurality of trigger frame variants corresponding to the MU ranging measurement procedures includes any suitable combination of two or more of the following: i) a trigger for soliciting an UL MU transmission having ranging measurement readiness packets for an MU ranging measurement procedure (e.g., trigger frame in PPDU 312), ii) a trigger for soliciting an UL MU transmission having ranging measurement request packets for an MU ranging measurement procedure (e.g., trigger frame in PPDU 404), iii) a trigger for soliciting an UL MU transmission having NDPs for an MU ranging measurement procedure (e.g., trigger frame in PPDU 216), iv) a trigger for soliciting an UL MU transmission having ranging measurement feedback packets for an MU ranging measurement procedure (e.g., trigger frame in PPDU 260), etc. In another embodiment, the plurality of trigger frame variants corresponding to the MU ranging measurement procedures also includes one or more other suitable trigger frame variants corresponding to the MU ranging measurement procedure. In another embodiment, the plurality of trigger frame variants corresponding to the MU ranging measurement procedures includes two or more other suitable trigger frame variants corresponding to the MU ranging measurement procedure.

The subfield 638 is reserved, in an embodiment.

In an embodiment, trigger frame variants as utilized in MU ranging measurement procedures are indicated using a combination of the techniques described above with respect FIGS. 6A and 6B. For instance, one or more trigger frame variants among a plurality of variants corresponding to the MU ranging measurement procedures are indicated solely using the trigger type subfield 602, while one or more other trigger frame variants among the plurality of variants corresponding to the MU ranging measurement procedures are indicated using a combination of the trigger type subfield 602 and the trigger subtype subfield 636.

In an embodiment, a subfield in the user information field 512 of a trigger frame 500 is used to indicate the trigger frame variants as utilized in MU ranging measurement procedures. FIG. 7A illustrates an example format of a user information field 700. In an embodiment, the user information field 700 is included in the trigger frame 500 (e.g., as one or more of the user information fields 512). FIG. 7A indicates example lengths (e.g., in bits) of subfields of the user information field 700. In other embodiments, one or more of the subfields has another suitable length. In some embodiments, one or more of the subfields are omitted and/or one or more additional subfields are included in the user information field 700.

The user information field 700 includes an association identifier (AID) 12 subfield 702, a resource unit (RU) allocation subfield 704, a coding type subfield 706, a modulation and coding scheme (MCS) subfield 708, a dual carrier modulation (DCM) subfield 710, a spatial stream (SS) allocation random access (RA)-RU subfield 712, a target receive signal strength indicator (RSSI) subfield 714, an acknowledgment (ACK) indication subfield 716, and a trigger dependent user information field 718. In an embodiment, the trigger dependent user information subfield 718 is omitted from the user information field 512.

The AID12 subfield 702 includes an identifier of a client station 154 for which the user information field 700 is intended. In an embodiment, the AID 12 subfield 702 includes 12 least significant bits of an AID assigned to the client station 154 by the AP 114. The RU allocation subfield 704 includes a value corresponding to subcarriers assigned to the client station 154 for the UL MU transmission responsive to the trigger frame 500. The coding type subfield 706 includes a value indicating a coding type (e.g., binary convolution code (BCC), low density parity check (LDPC) code, etc.) to be used by the client station 154 for the UL MU transmission. The MCS subfield 708 includes a value indicating the MCS to be used by the client station 154 for the UL MU transmission. The DCM subfield 710 includes a value indicating whether or not DCM is to be utilized by the client station 154 for the UL MU transmission. In an embodiment, the SS allocation/RA-RU information subfield 712 includes a value indicating which spatial streams the client station 154 is to use for transmitting as part of the UL MU transmission. The target RSSI subfield 714 includes a value indicating a target receive signal power of the UL MU transmission by the client station 154. The ACK indication subfield 716 includes a value indicating whether or not the AP 114 will transmit an acknowledgement to the client station 154 in response to receiving a frame from the client station 154 included in the UL MU transmission.

Depending on the variant of the trigger frame 500 (e.g., as specified in the trigger type subfield 602) the trigger dependent user information subfield 718 is optionally present in the user information field 700. If present, the format of the trigger dependent user information subfield 718 is dependent on the variant of the trigger frame 500, in at least some embodiments. Further, in an embodiment, one or more of the subfield 704, subfield 706, subfield 708, and/or subfield 716 are reserved from use based on the variant of the trigger frame 500. For instance, when the trigger frame 500 is for soliciting an UL MU transmission for an MU ranging measurement procedure, the subfield 704, the subfield 706, the subfield 708, and the subfield 716 are reserved from use and the trigger dependent user information subfield 718 is not present, in an embodiment.

Trigger frames such as those described above may be utilized in random access MU UL transmissions (e.g., an MU UL transmission in which one or more RUs are not assigned to any particular client stations, but rather are available for client stations to contend for use of (e.g., sometimes referred to as "random access RUs")), in at least some embodiments. In an embodiment, one or more of the triggers as described in MU ranging measurement procedures described above correspond to triggers that prompt client stations to contend for access to one or more random access RUs to transmit as part of the MU UL transmission, and include RU allocations that are specified for random access UL MU transmissions. Such trigger frames are sometimes referred to herein as "random access triggers". Following the reception of a trigger frame 500 corresponding to a random access trigger, a client station 154 uses a corresponding backoff counter to determine whether the RU is idle and available to the client station 154 to transmit as part of an UL MU transmission. In an embodiment, the backoff counter is initialized to a random integer value and is decremented for every random access trigger that is received by the client station 154. When the backoff counter reaches 0, the corresponding client station 154 responds to the trigger frame 500 corresponding to a random access trigger in an RU allocated for the random access UL MU transmission.

In various embodiments, one or more of PPDUs 352, 404, etc., are random access triggers, and one or more of PPDUs 356, 408, etc., are transmitted by at least some of the client stations 154 using random access procedures such as described above. In one or more embodiments corresponding to random access triggers, one or more of the subfields of the user information field 512 of the trigger frames 500 are coded differently.

In an embodiment corresponding to a random access procedure, specific values in the AID 12 subfield 702 (e.g., 0 or 2045) indicate that the user information field 700 corresponds to one or more random access RUs. For instance, a value of 0 in the AID 12 subfield 702 indicates that the user information field 700 corresponds to a random access UL MU transmission and further indicates that the RU allocation subfield 704 includes an RU allocation (for random access MU UL transmission) for client stations 154 that are associated with the AP 114. A value of 2045 in the AID 12 subfield 702 indicates that the user information field 700 corresponds to a random access UL MU transmission and further indicates that the RU allocation subfield 704 includes an RU allocation (for random access MU UL transmission) for client stations 154 that are not associated with the AP 114. In an embodiment, a specific value in the AID 12 subfield 702 indicates that the user information field 700 corresponds to a random access UL MU transmission and further indicates that the RU allocation subfield 704 includes an RU allocation (for random access MU UL transmission) for all client stations 154, irrespective of their association with the AP 114. In an embodiment corresponding to a random access UL MU transmission, the SS allocation/RA-RU information subfield 712 includes a value indicating a number of contiguous RUs allocated for the random access UL MU transmission.

In another embodiment corresponding to a random access procedure, specific values of the AID 12 subfield 702 may indicate a trigger frame variant of the trigger frame 500 in addition to indicating that that the user information field 700 corresponds to a random access UL MU transmission. For instance, at least some of the trigger frame variants as utilized in MU ranging measurement procedures described above may be indicated using the AID 12 subfield 702, wherein the AID 12 subfield 702 further indicates that the trigger frame 500 corresponds to a random access trigger. In some such embodiments, the trigger type subfield 602 may indicate that the trigger frame corresponds to a default trigger frame variant (e.g., a basic trigger), while the AID 12 subfield 702 indicates a specific trigger subtype corresponding to an MU ranging measurement procedure and further indicates that the trigger frame 500 corresponds to a random access trigger. In another embodiment, the trigger type subfield 602 may indicate that the trigger frame 500 is a trigger corresponding to an MU ranging measurement procedure, while the AID 12 subfield 702 indicates a specific trigger subtype corresponding to the MU ranging measurement procedure and further indicates that the trigger frame 500 corresponds to a random access trigger. In an embodiment, the trigger frame variants that may be indicated in the AID 12 subfield 702 include: i) a trigger for soliciting an UL MU transmission having respective ranging measurement readiness packets for an MU ranging measurement procedure (e.g., trigger frame in PPDU 312), ii) a trigger for soliciting an UL MU transmission having respective ranging measurement request packets for an MU ranging measurement procedure (e.g., trigger frame in PPDU 404), etc.

In an embodiment, a value of 2040 in the AID 12 subfield 702 indicates that the trigger frame 500 i) is a trigger for soliciting an UL MU transmission having respective ranging measurement request packets from respective client stations 154, and ii) corresponds to a random access trigger. In an embodiment, a value of 2041 in the AID 12 subfield 702 indicates that the trigger frame 500 i) is a trigger for soliciting an UL MU transmission having respective ranging measurement readiness packets from respective client stations 154, and ii) corresponds to a random access trigger.

In an embodiment, a trigger frame, such as the trigger frame 500, may include one or more user information fields that correspond to one or more random access RUs and also include one or more other user information fields that do not correspond to random access RUs. For instance, the one or more other user information fields include indications of RUs assigned to specific client stations 154.

In an embodiment, trigger dependent user information subfields 718 of trigger frames 500 corresponding to trigger frame variants that are not specifically associated with an MU ranging measurement procedure (e.g., a basic trigger, an NFRP trigger, etc.) may be used to indicate a trigger frame variant corresponding to an MU ranging measurement procedure.

FIGS. 7B and 7C illustrate example formats of trigger dependent user information subfields 720 and 730, respectively. In an embodiment, the example formats correspond to a trigger dependent user information field 718 of a trigger frame 500 corresponding to a basic trigger frame variant. FIGS. 7B and 7C also indicate example lengths (e.g., in bits) of subfields of the trigger dependent user information subfields 720 and 730, respectively. In other embodiments, one or more of the subfields has another suitable length. In some embodiments, one or more of the subfields are omitted and/or one or more additional subfields are included in the trigger dependent user information subfields 720 and 730.

The ranging measurement request subfield 732 indicates a format of the trigger dependent user information field 720 or 730. In an embodiment, a value of 1 in the ranging measurement request subfield 732 indicates that the trigger dependent user information subfield includes information corresponding to a ranging measurement procedure. A value of 0 in the ranging measurement request subfield 732 indicates that the trigger dependent user information subfield includes different information.

FIG. 7B corresponds to a trigger dependent user information subfield 720 with the ranging measurement request subfield 732 set to 0. An MPDU MU spacing factor subfield 734 includes a value that is used at the client station 154 to determine a minimum duration between transmissions of two consecutive MPDUs by the client station 154 in an UL MU transmission responsive to the trigger frame 500. A traffic identifier (TID) aggregation limit subfield 736 includes a value that indicates a number of MPDUs allowed in an aggregated MPDU (A-MPDU) transmitted by the client station 154 in the UL MU transmission and, further specifies a maximum number of TIDs that can be included in the A-MPDU. A preferred access category (AC) subfield 738 includes a value indicating a lowest AC (e.g., best effort, background, video, voice, etc.) that is recommended for aggregation of MPDUs in the A-MPDU transmitted by the client station 154 in the UL MU transmission.

FIG. 7C corresponds to a trigger dependent user information subfield 730 with the ranging measurement request subfield set to 1. The value of the trigger subtype subfield 740 is selected from among a plurality of values corresponding to a plurality of trigger frame variants as utilized in MU ranging measurement procedures described above (e.g., trigger frames in DL PPDU 216, DL PPDU 260, DL PPDU 312, DL PPDU 404, and/or DL PPDU 454). In an embodiment, the plurality of trigger frame variants corresponding to the MU ranging measurement procedure includes any suitable combination of two or more of the following: i) a trigger for soliciting an UL MU transmission having ranging measurement readiness packets for an MU ranging measurement procedure (e.g., trigger frame in PPDU 312), ii) a trigger for soliciting an UL MU transmission having ranging measurement request packets for an MU ranging measurement procedure (e.g., trigger frame in PPDU 404), iii) a trigger for soliciting an UL MU transmission having NDPs for an MU ranging measurement procedure (e.g., trigger frame in PPDU 216), iv) a trigger for soliciting an UL MU transmission having ranging measurement feedback packets for an MU ranging measurement procedure (e.g., trigger frame in PPDU 260), etc. The subfields 742 and 744 are reserved, in an embodiment.

In an embodiment, trigger frame variants as utilized in MU ranging measurement procedures of FIGS. 2A, 2B, 3A, 3B, 4A, and 4B are indicated using a combination of two or more of the techniques described above with respect FIGS. 6A, 6B, 7A, 7B, and 7C. For instance, one or more trigger frame variants among the plurality of variants corresponding to the MU ranging measurement procedures are indicated using a combination of the trigger type subfield 602 and the trigger dependent common information subfield 634, and one or more other trigger frame variants among the plurality of variants corresponding to the MU ranging measurement procedures are indicated using the trigger dependent user information subfield 718 or the AID subfield 702.

FIG. 7D illustrates another example format of a trigger dependent user information subfield 750, according to an embodiment. In an embodiment, the example format of FIG. 7D corresponds to a trigger dependent user information field 718 of a trigger frame 500 corresponding to an NFRP trigger frame variant. FIG. 7D also indicates example lengths (e.g., in bits) of subfields of the trigger dependent user information subfield 750. In other embodiments, one or more of the subfields has another suitable length. In some embodiments, one or more of the subfields are omitted and/or one or more additional subfields are included in the trigger dependent user information subfield 750.

As described above with respect to FIG. 5, an NFRP trigger is used to request NDPs from client stations 154 as feedback. In an embodiment, for instance, with reference to FIG. 4B, an NFRP trigger in the DL PPDU 454 may be used to solicit the UL MU NDP transmission 458, from client stations 154, that includes respective NDPs indicating presence of the respective client stations 154. In an embodiment, an NFRP trigger may additionally be used to solicit an UL MU transmission having respective NDPs indicating readiness of the respective client stations 154 for an MU ranging measurement procedure. For instance, an NFRP trigger may be included in the DL PPDU 352, as described above with respect to FIG. 3B, to prompt the client stations 154 to transmit, to the AP 114, respective NDPs (in the UL MU transmission 356) indicative of readiness of the respective client stations 154 for an MU ranging measurement procedure. In an embodiment, the NFRP trigger may additionally be used for one or more other trigger frame variants corresponding to MU ranging measurement procedures described above.

A feedback type subfield 760 includes a value that indicates a variant of and/or a procedure corresponding to the trigger frame 500. The value of the feedback type subfield 760 is selected from among a plurality of values, including values corresponding to a plurality of trigger frame variants as utilized in MU ranging measurement procedures. In an embodiment, the plurality of trigger frame variants corresponding to the MU ranging measurement procedure includes two or more of: i) a trigger for soliciting an UL MU transmission having ranging measurement readiness packets for an MU ranging measurement procedure (e.g., trigger frame in PPDU 312), ii) a trigger for soliciting an UL MU transmission having ranging measurement request packets for an MU ranging measurement procedure (e.g., trigger frame in PPDU 404), iii) a trigger for soliciting an UL MU transmission having NDPs for an MU ranging measurement procedure (e.g., trigger frame in PPDU 216), iv) a trigger for soliciting an UL MU transmission having ranging measurement feedback packets for an MU ranging measurement procedure (e.g., trigger frame in PPDU 260), v) a trigger for soliciting an UL MU transmission having respective NDPs indicating presence of the respective client stations 154 (e.g., trigger frame in PPDU 454), etc.

The feedback size subfield 762 indicates a size of ranging measurement feedback. The scheduling type subfield 764 indicates a schedule type of MU NDP ranging measurement, e.g., Type 1 or Type 2 STA schedule, secure or unsecure ranging schedule, etc. The group identifier (ID) subfield 766 includes a value indicating a group ID corresponding to the client stations 154 from which the NDPs are being solicited in the UL MU transmission. In an embodiment, the group is established through negotiation and members of a group have a same set of ranging measurement capabilities. The starting STA subfield 768 indicates a first AID of a range of AIDs corresponding to the client stations 154 that are scheduled to transmit in the UL MU transmission. The target RSSI subfield 770 includes a value indicating a target receive signal power of the UL MU transmission by the client stations 154. The resource request buffer threshold subfield 774 is used for a buffer status report of a STA, which is reserved in the trigger frame 500 (e.g., the subfield 774 is not used in ranging measurements), according to an embodiment.

In an embodiment, trigger frame variants as utilized in MU ranging measurement procedures of FIGS. 2A, 2B, 3A, 3B, 4A, and 4B are indicated using a combination of two or more of the techniques described above with respect FIGS. 6A, 6B, 7A, 7B, 7C, and 7D. For instance, one or more trigger frame variants among the plurality of variants corresponding to the MU ranging measurement procedures are indicated using a combination of the trigger type subfield 602 and the trigger dependent common information subfield 634, and one or more other trigger frame variants among the plurality of variants corresponding to the MU ranging measurement procedures are indicated using a feedback type subfield 760 in an NFRP trigger.

In an embodiment, the user information field 512 includes information that is used to authenticate an UL MU transmission for a ranging measurement procedure from client stations 154. FIG. 8A illustrates an example user information field 800 of the trigger frame 500, in an embodiment. FIG. 8A indicates example lengths (e.g., in bits) of subfields of the user information field 512. In other embodiments, one or more of the subfields has another suitable length. In some embodiments, one or more of the subfields are omitted and/or one or more additional subfields are included in the user information field 800. Some subfields in the user information field 800 are similar to corresponding subfields in the user information field 700 illustrated in FIG. 7A, and like-numbered elements are not described in detail merely for purposes of brevity.

The sequence authentication code (SAC) subfield 802 includes an SAC value that is used for authenticating a trigger frame and/or NDPs transmitted in response to the trigger frame. For example, in an embodiment wherein the trigger frame 500 is a trigger for soliciting an UL MU transmission having respective NDPs from respective client stations 154 for an MU ranging measurement procedure (e.g., trigger in DL PPDU 216), the SAC subfield indicates respective LTF formats to be used by the respective client stations 154 for transmission of respective NDPs. In an embodiment, an AP 114 that receives an NDP transmitted by a client station 154, in response to a trigger frame 500, authenticates the NDP by comparing the LTF format of the NDP with the indication in the SAC subfield 802.

In an embodiment where the SAC value has a number of bits that is larger than a number of bits that can be accommodated in the SAC subfield 802, at least some bits of the SAC may be indicated in the common information field 510. FIGS. 8B and 8C illustrates an example format of a trigger dependent common information subfield 810 (of a common information field 510) and an example format of a user information field 820. Some subfields in the trigger dependent common information subfield 810 and the user information field 820 are similar to corresponding subfields in the trigger dependent common information subfield 640 illustrated in FIG. 6B and the user information field 700 of FIG. 7A, and like-numbered elements are not described in detail merely for purposes of brevity. In another embodiment, part of the SAC field is in the Trigger dependent User Info field, which can be one-octet long, two-octet long, or have another suitable length. In another embodiment, the whole SAC field is in the Trigger dependent User Info field, which can be two-octet long, three-octet long, or have another suitable length.

Referring now to FIG. 8B, the trigger subtype subfield 636 includes a value indicating the trigger frame variant as utilized in an MU ranging measurement procedure, as described above with respect to FIG. 6B. An SAC most significant bits (MSB) subfield 806 includes a plurality of most significant bits of an SAC value. Referring now to FIG. 8C, an SAC least significant bits (LSB) subfield 808 includes a plurality of least significant bits of the SAC value.

In an embodiment where all client stations 154 share a common SAC, the entirety of the SAC is indicated in a subfield of the trigger dependent common information subfield 810.

Figure 9:
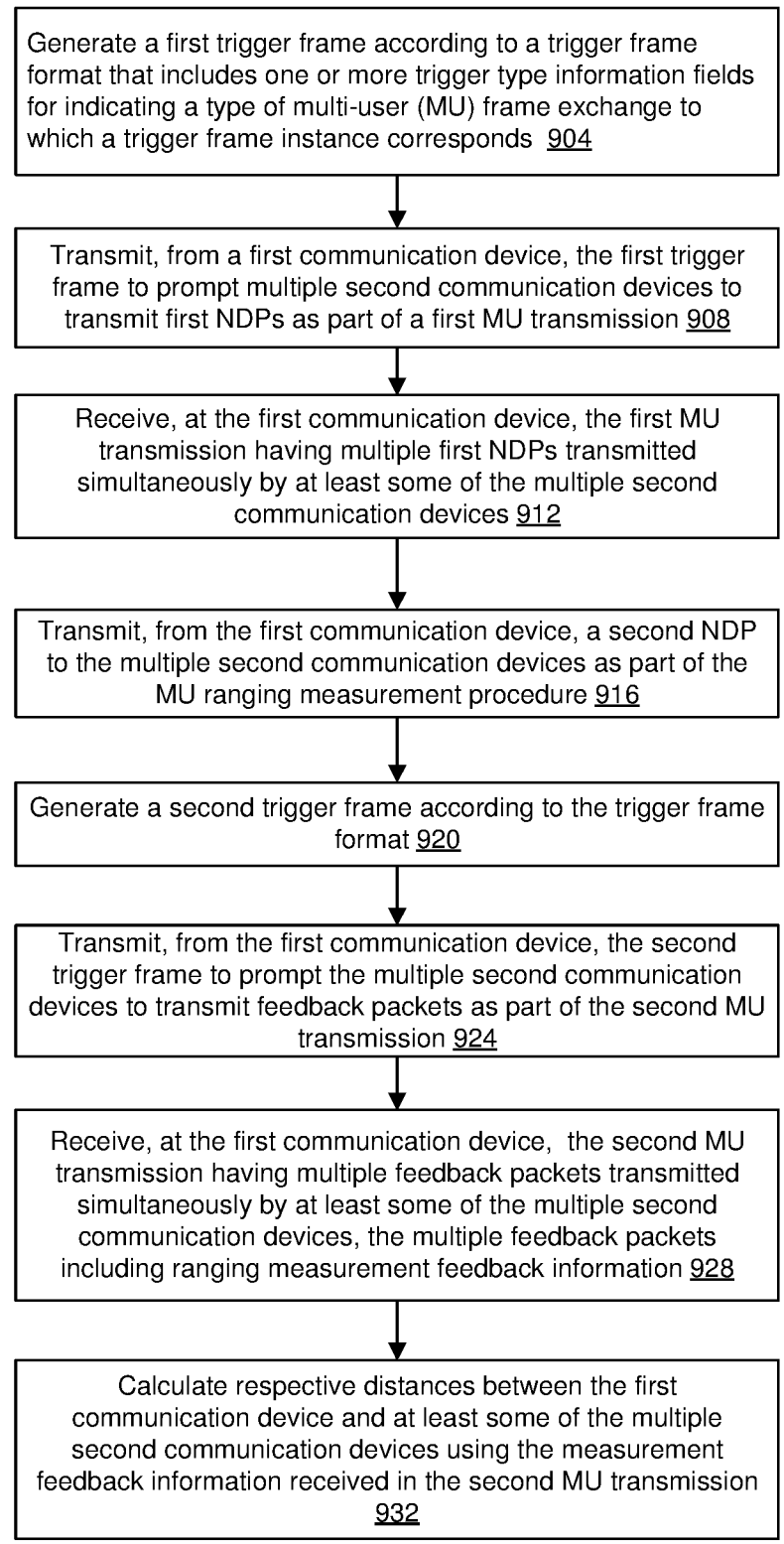
FIG. 9 is a flow diagram of an example method for performing ranging measurements, according to an embodiment.

FIG. 9 is a flow diagram of an example method 900 for performing a ranging measurement procedure, according to an embodiment. In some embodiments, the AP 114 (e.g., the network interface device 122) of FIG. 1 is configured to implement the method 900. The method 900 is described in the context of the AP 114 merely for explanatory purposes and, in other embodiments, the method 900 is implemented by another suitable device. For instance, in an embodiment, the client station 154 (e.g., network interface device 162) of FIG. 1 is configured to implement the method 900.

The method 900 is implemented in conjunction with the procedures, frame formats, etc., described above in connection with one or more of FIGS. 2A, 2B, 3A, 3B, 4A, 4B, 5, 6A, 6B, 7A-7D, and 8A-8C, in various embodiments. In other embodiments, the method 900 is implemented in conjunction with suitable procedures, frame formats, etc., different than those discussed above.

At block 904, the AP 114 generates (the network interface device 122 generates, the MAC processor 126 generates, etc.) a first trigger frame that includes one or more trigger type information fields for indicating a type of MU frame exchange to which a trigger frame instance corresponds. In an embodiment, the first trigger frame is generated to include one or more trigger type information fields set to corresponding values that indicate i) the first trigger frame is for an MU ranging measurement procedure, and ii) the first trigger frame is for prompting multiple client stations 154 from among a plurality of client stations 154 to simultaneously transmit first NDPs to the AP 114 as part of a first MU transmission associated with the MU ranging measurement procedure. In an embodiment, the one or more trigger type information fields are one or more of a trigger type subfield, a trigger subtype subfield, a feedback type subfield, an AID subfield, etc., as described above in the context of FIGS. 6A, 6B, 7A-7D, and 8A-8C. In other embodiments, at least one of the one or more trigger type information fields are one or more suitable fields/subfields different than those described above in the context of FIGS. 6A, 6B, 7A-7D, and 8A-8C.

At block 908, the AP 114 transmits (the network interface device 122 transmits, the PHY processor 130 transmits, etc.) the first trigger frame to prompt the multiple client stations 154 to transmit first NDPs as part of the first MU transmission. For instance, as described above with respect to FIG. 2A, the first trigger frame is included in a DL PPDU 216 and transmitted to multiple client stations 154.

At block 912, the AP 114 receives (the network interface device 122 receives, the PHY processor 130 receives, etc.) the first MU transmission having multiple first NDPs transmitted simultaneously by at least some of the multiple client stations 154. The multiple first NDPs are for the MU ranging measurement procedure and are transmitted by the at least some of the multiple client stations 154 in response to the first trigger frame. For instance, as described above with respect to FIG. 2A, the multiple first NDPs are included in an UL MU transmission 220.

At block 916, the AP 114 transmits (the network interface device 122 transmits, the PHY processor 130 transmits, etc.) a second NDP to the multiple client stations 154 as part of the MU ranging measurement procedure.

At block 920, the AP 114 generates (the network interface device 122 generates, the MAC processor 126 generates, etc.) a second trigger frame for the MU ranging measurement procedure. In an embodiment, one or more trigger type information fields in the second trigger frame include one or more respective values that indicate the second trigger frame includes one or more trigger type information fields set to corresponding values that indicate i) the second trigger frame is for an MU ranging measurement procedure, and ii) the second trigger frame is for prompting the multiple second communication devices to simultaneously transmit feedback packets to the first communication device as part of a second MU transmission associated with the MU ranging measurement procedure. In an embodiment, the one or more trigger type information fields are one or more of a trigger type subfield, a trigger subtype subfield, a feedback type subfield, an AID subfield, etc., such as described above in the context of FIGS. 6A, 6B, 7A-7D, and 8A-8C. In other embodiments, at least one of the one or more trigger type information fields are one or more suitable fields/subfields different than those described above in the context of FIGS. 6A, 6B, 7A-7D, and 8A-8C.

At block 924, the AP 114 transmits (the network interface device 122 transmits, the PHY processor 130 transmits, etc.) the second trigger frame to prompt the multiple client stations 154 to transmit feedback packets as part of the second MU transmission. For instance, as described above with respect to FIG. 2A, the second trigger frame is included in a DL PPDU 260 and transmitted to multiple client stations 154.

At block 928, the AP 114 receives (the network interface device 122 receives, the PHY processor 130 receives, etc.) the second MU transmission having multiple feedback packets transmitted simultaneously by at least some of the client stations 154, the multiple feedback packets including ranging measurement feedback information. In an embodiment, the ranging measurement feedback information includes one or more of timing and angle of arrival/departure information corresponding to i) transmission of the first NDPs from the client stations 154, and ii) reception of the second NDP at the client stations 154 (e.g., $t_{1,k}$, $t_{4,k}$, $AoD_{1,k}$, $AoA_{2,k}$, etc.). In an embodiment, the ranging measurement feedback information includes: times corresponding to transmission of the multiple first NDPs transmitted simultaneously by at least some of the multiple second communication devices; and times corresponding to reception of the second NDP at the at least some of the multiple second communication devices.

At block 932, the AP 114 calculates (the network interface device 122 calculates, the MAC processor 126 calculates, etc.) respective distances between the AP 114 and at least some of the multiple client stations 154 using the measurement feedback information received in the second MU transmission. For instance, as described above in the context of FIGS. 2A and 2B, the AP 114 calculates respective times of flights to determine the respective distances and/or uses a triangulation algorithms to determine the respective positions of the client stations 154.

In another embodiment, the method 900 also includes: generating, at the first communication device, a third trigger frame according to the trigger frame format, wherein generating the third trigger frame includes: setting the one or more trigger type information fields of the third trigger frame to a third one or more respective values that indicates i) the third trigger frame is for an MU ranging measurement procedure, and ii) the third trigger frame is for prompting the plurality of second communication devices to simultaneously transmit ranging measurement request packets to the first communication device as part of a third MU transmission associated with the MU ranging measurement procedure; transmitting, by the first communication device, the third trigger frame to prompt at least some second communication devices to transmit ranging measurement request packets as part of the third MU transmission; and determining, at the first communication device and using information in the ranging measurement request packets, a group of second communication devices, from among the plurality of second communication devices, that are requesting to participate in the MU ranging measurement procedure.

In another embodiment, the method 900 also includes: generating, at the first communication device, a third trigger frame according to the trigger frame format, wherein generating the third trigger frame includes: setting the one or more trigger type information fields of the third trigger frame to a third one or more respective values that indicates i) the third trigger frame is for an MU ranging measurement procedure, and ii) the third trigger frame is for prompting the multiple second communication devices to simultaneously transmit ranging measurement readiness packets to the first communication device as part of a third MU transmission associated with the MU ranging measurement procedure; transmitting, by the first communication device, the third trigger frame to prompt at least some second communication devices to transmit ranging measurement readiness packets as part of the third MU transmission; and determining, at the first communication device and using information in the ranging measurement readiness packets, a group of second communication devices, from among the plurality of second communication devices, that are ready to participate in the MU ranging measurement procedure.

In an embodiment, the trigger frame format includes: i) a trigger type field for indicating the type of MU frame exchange, and ii) a trigger subtype subfield in a trigger-type dependent field when the trigger type field is set to a first value that indicates the trigger frame is for the MU ranging measurement procedure; generating the first trigger frame includes: setting the trigger type field of the first trigger frame to the first value, and setting the trigger subtype subfield of the first trigger frame to a second value indicating that the first trigger frame is for prompting the multiple second communication devices to simultaneously transmit first NDPs to the first communication device as part of the first MU transmission associated with the MU ranging measurement procedure; and generating the second trigger frame includes: setting the trigger type field of the second trigger frame to the first value, and setting the trigger subtype subfield of the second trigger frame to a third value indicating that the second trigger frame is for prompting the multiple second communication devices to simultaneously transmit feedback packets to the first communication device as part of the second MU transmission associated with the MU ranging measurement procedure.

In another embodiment, the method 900 also includes: generating, at the first communication device, a third trigger frame according to the trigger frame format, wherein generating the third trigger frame includes: setting the trigger type field of the third trigger frame to the first value, and setting the trigger subtype subfield of the third trigger frame to a third value indicating that the third trigger frame is for prompting the plurality of second communication devices to simultaneously transmit ranging measurement request packets to the first communication device as part of a third MU transmission associated with the MU ranging measurement procedure; transmitting, by the first communication device, the third trigger frame to prompt at least some second communication devices to transmit ranging measurement request packets as part of the third MU transmission; and determining, at the first communication device and using information in the ranging measurement request packets, a group of second communication devices, from among the plurality of second communication devices, that are requesting to participate in the MU ranging measurement procedure.

In another embodiment, the method 900 further includes: generating, at the first communication device, a third trigger frame according to the trigger frame format, wherein generating the third trigger frame includes: setting the trigger type field of the third trigger frame to the first value, and setting the trigger subtype subfield of the third trigger frame to a third value indicating that the third trigger frame is for prompting the multiple second communication devices to simultaneously transmit ranging measurement readiness packets to the first communication device as part of a third MU transmission associated with the MU ranging measurement procedure; transmitting, by the first communication device, the third trigger frame to prompt at least some second communication devices to transmit ranging measurement readiness packets as part of the third MU transmission; and determining, at the first communication device and using information in the ranging measurement readiness packets, a group of second communication devices, from among the plurality of second communication devices, that are ready to participate in the MU ranging measurement procedure.

Figure 10:
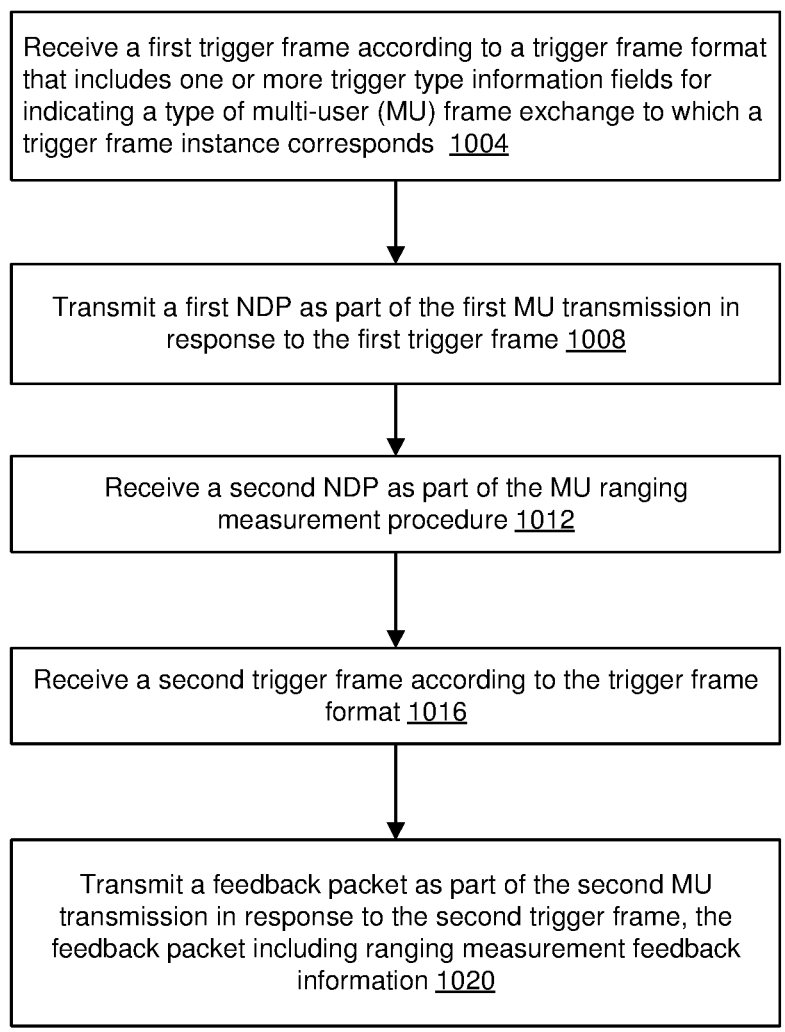
FIG. 10 is a flow diagram of another example method for performing ranging measurements, according to an embodiment.

FIG. 10 is a flow diagram of an example method 1000 for performing a ranging measurement procedure, according to an embodiment. In some embodiments, the client station 154 (e.g., the network interface device 162) of FIG. 1 is configured to implement the method 1000. The method 1000 is described, however, in the context of the client station 154 merely for explanatory purposes and, in other embodiments, the method 1000 is implemented by another suitable device. For instance, in an embodiment, the AP 114 (e.g., the network interface device 122) of FIG. 1 is configured to implement the method 1000.

The method 1000 is implemented in conjunction with the procedures, frame formats, etc., described above in connection with one or more of FIGS. 2A, 2B, 3A, 3B, 4A, 4B, 5, 6A, 6B, 7A-7D, and 8A-8C, in various embodiments. In other embodiments, the method 1000 is implemented in conjunction with suitable procedures, frame formats, etc., different than those discussed above.

At block 1004, the client station 154 receives (the network interface device 162 receives, the PHY processor 170 receives, etc.) a first trigger frame, from an AP 114, that includes one or more trigger type information fields for indicating a type of MU frame exchange to which a trigger frame instance corresponds. In an embodiment, the first trigger frame includes one or more trigger type information fields set to corresponding values that indicate i) the first trigger frame is for an MU ranging measurement procedure, and ii) the first trigger frame is for prompting multiple client stations 154 from among a plurality of client stations 154 to simultaneously transmit first NDPs to the AP 114 as part of a first MU transmission associated with the MU ranging measurement procedure. In an embodiment, the one or more trigger type information fields are one or more of a trigger type subfield, a trigger subtype subfield, a feedback type subfield, an AID subfield, etc., as described above in the context of FIGS. 6A, 6B, 7A-7D, and 8A-8C. In other embodiments, at least one of the one or more trigger type information fields are one or more suitable fields/subfields different than those described above in the context of FIGS. 6A, 6B, 7A-7D, and 8A-8C.

At block 1008, the client station 154 transmits (the network interface device 162 transmits, the PHY processor 170 transmits, etc.), to the AP 114, a first NDP as part of the first MU transmission in response to the first trigger frame. In an embodiment, as described above with respect to FIG. 2A, the first NDP is included in an UL MU transmission 220. In an embodiment, as described above with respect to FIGS. 2A and 2B, the client station 154 records timing information and/or angle of departure information corresponding to the transmission of the first NDP.

At block 1012, the client station 154 receives (the network interface device 162 receives, the PHY processor 170 receives, etc.), from the AP 114, a second NDP as part of the MU ranging measurement procedure. In an embodiment, as described above with respect to FIGS. 2A and 2B, the client station 154 records timing information and/or angle of arrival information corresponding to the reception of second NDP.

At block 1016, the client station 154 receives (the network interface device 162 receives, the PHY processor 170 receives, etc.), from the AP 114, a second trigger frame according to the trigger frame format, wherein the second trigger frame includes the one or more trigger type information fields set to a second one or more respective values that indicates that i) the second trigger frame is for an MU ranging measurement procedure, and ii) the second trigger frame is for prompting the client stations 154 to simultaneously transmit respective feedback packets to the AP 114 as part of a second MU transmission associated with the MU ranging measurement procedure. In an embodiment, the one or more trigger type information fields are one or more of a trigger type subfield, a trigger subtype subfield, a feedback type subfield, an AID subfield, etc., as described above in the context of FIGS. 6A, 6B, 7A-7D, and 8A-8C. In other embodiments, at least one of the one or more trigger type information fields are one or more suitable fields/subfields different than those described above in the context of FIGS. 6A, 6B, 7A-7D, and 8A-8C.

At block 1020, the client station 154 transmits (the network interface device 162 transmits, the PHY processor 170 transmits, etc.), to the AP 114, a feedback packet as part of the second MU transmission in response to the second trigger frame, the feedback packet including ranging measurement feedback information, wherein the ranging measurement feedback information is useable at the second communication device to calculate a distance between the first communication device and the second communication device. In an embodiment, the ranging measurement feedback information includes one or more of timing and angle of arrival/departure information corresponding to transmission of the first NDPs and reception of the second NDP (e.g., $t_{1,k}$, $t_{4,k}$, $AoD_{1,k}$, $AoA_{2,k}$, etc.). In an embodiment, the ranging measurement feedback information includes: a time corresponding to transmission of the first NDP, from the first communication device, as part of the first MU transmission in response to the first trigger frame; and a time corresponding to reception of the second NDP at the first communication device.

In an embodiment, the method 1000 further comprises: receiving, at the first communication device and from the second communication device, a third trigger frame according to the trigger frame format, wherein the third trigger frame includes: the one or more trigger type information fields of the third trigger frame set to a third one or more respective values that indicates i) the third trigger frame is for an MU ranging measurement procedure, and ii) the third trigger frame is for prompting the first communication device and the one or more third communication devices to simultaneously transmit ranging measurement request packets to the second communication device as part of a third MU transmission associated with the MU ranging measurement procedure; and transmitting, from the first communication device to the second communication device, a ranging measurement request packet as part of the third MU transmission.

In another embodiment, the method 1000 further comprises: receiving, at the first communication device and from the second communication device, a third trigger frame according to the trigger frame format, wherein the third trigger frame includes: the one or more trigger type information fields of the third trigger frame set to a third one or more respective values that indicates i) the third trigger frame is for an MU ranging measurement procedure, and ii) the third trigger frame is for prompting the first communication device and the one or more third communication devices to simultaneously transmit ranging measurement readiness packets to the second communication device as part of a third MU transmission associated with the MU ranging measurement procedure; and transmitting, from the first communication device to the second communication device, a ranging measurement readiness packet as part of the third MU transmission.

In another embodiment, the trigger frame format includes: i) a trigger type field for indicating the type of MU frame exchange, and ii) a trigger subtype subfield in a trigger-type dependent field when the trigger type field is set to a first value that indicates the trigger frame is for the MU ranging measurement procedure; the first trigger frame includes: the trigger type field set to the first value, and the trigger subtype subfield set to a second value indicating that the first trigger frame is for prompting the first communication device and the one or more third communication devices to simultaneously transmit respective first NDPs to the second communication device as part of the first MU transmission associated with the MU ranging measurement procedure; and the second trigger frame includes: the trigger type field set to the first value, and the trigger subtype subfield set to a third value indicating that the second trigger frame is for prompting the first communication device and the one or more third communication devices to simultaneously transmit feedback packets to the second communication device as part of the second MU transmission associated with the MU ranging measurement procedure.

In another embodiment, the method 1000 further includes: receiving, at the first communication device from the second communication device, a third trigger frame according to the trigger frame format, wherein the third trigger frame includes: the trigger type field set to the first value, and the trigger subtype subfield set to a third value indicating that the third trigger frame is for prompting the first communication device and the one or more third communication devices to simultaneously transmit ranging measurement request packets to the second communication device as part of a third MU transmission associated with the MU ranging measurement procedure; and transmitting, from the first communication device to the second communication device, a ranging measurement request packet as part of the third MU transmission.

In another embodiment, the method 1000 further includes: receiving, at the first communication device from the second communication device, a third trigger frame according to the trigger frame format, wherein the third trigger frame includes: the trigger type field set to the first value, and the trigger subtype subfield set to a third value indicating that the third trigger frame is for prompting the first communication device and the one or more third communication devices to simultaneously transmit ranging measurement readiness packets to the second communication device as part of a third MU transmission associated with the MU ranging measurement procedure; and transmitting, from the first communication device to the second communication device, a ranging measurement readiness packet as part of the third MU transmission.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for performing ranging measurements, the method comprising:

generating, at a first communication device, a first trigger frame according to a trigger frame format that includes one or more trigger type information fields for indicating a type of multi-user (MU) frame exchange to which a trigger frame instance corresponds, wherein generating the first trigger frame includes:

setting the one or more trigger type information fields of the first trigger frame to a first one or more respective values that indicates the first trigger frame is for: i) an MU ranging measurement procedure, and ii) causing multiple second communication devices from among a plurality of second communication devices to simultaneously transmit first null data packets (NDPs) to the first communication device as part of a first MU transmission associated with the MU ranging measurement procedure;

transmitting, by the first communication device, the first trigger frame to cause the multiple second communication devices to transmit the first NDPs as part of the first MU transmission;

receiving, at the first communication device, the first MU transmission having multiple first NDPs transmitted simultaneously by at least some of the multiple second communication devices;

transmitting, by the first communication device, a second NDP to the multiple second communication devices as part of the MU ranging measurement procedure;

generating, at the first communication device, a second trigger frame according to the trigger frame format, wherein generating the second trigger frame includes:

setting the one or more trigger type information fields of the second trigger frame to a second one or more respective values that indicates the second trigger frame is for i) an MU ranging measurement procedure, and ii) causing the multiple second communication devices to simultaneously transmit feedback packets to the first communication device as part of a second MU transmission associated with the MU ranging measurement procedure;

transmitting, by the first communication device, the second trigger frame to cause the multiple second communication devices to transmit the feedback packets as part of the second MU transmission;

receiving, at the first communication device, the second MU transmission having multiple feedback packets transmitted simultaneously by at least some of the multiple second communication devices, the multiple feedback packets including ranging measurement feedback information; and calculating, at the first communication device, one or more respective distances between the first communication device and at least one of the multiple second communication devices using the measurement feedback information received in the second MU transmission;

wherein:

the trigger frame format includes: i) a trigger type field for indicating the type of MU frame exchange, and ii) a trigger subtype subfield in a trigger-type dependent field when the trigger type field is set to a first value that indicates the trigger frame is for the MU ranging measurement procedure;

generating the first trigger frame includes:

setting the trigger type field of the first trigger frame to the first value, and setting the trigger subtype subfield of the first trigger frame to a second value indicating that the first trigger frame is for causing the multiple second communication devices to simultaneously transmit first NDPs to the first communication device as part of the first MU transmission associated with the MU ranging measurement procedure; and generating the second trigger frame includes:

setting the trigger type field of the second trigger frame to the first value, and setting the trigger subtype subfield of the second trigger frame to a third value indicating that the second trigger frame is for causing the multiple second communication devices to simultaneously transmit feedback packets to the first communication device as part of the second MU transmission associated with the MU ranging measurement procedure.

2. The method of claim 1, further comprising:

generating, at the first communication device, a third trigger frame according to the trigger frame format, wherein generating the third trigger frame includes:

setting the one or more trigger type information fields of the third trigger frame to a third one or more respective values that indicates the third trigger frame is for i) an MU ranging measurement procedure, and ii) the third trigger frame is for causing the plurality of second communication devices to simultaneously transmit ranging measurement request packets to the first communication device as part of a third MU transmission associated with the MU ranging measurement procedure;

transmitting, by the first communication device, the third trigger frame to cause at least some second communication devices to transmit ranging measurement request packets as part of the third MU transmission; and determining, at the first communication device and using information in the ranging measurement request packets, a group of second communication devices, from among the plurality of second communication devices, that are requesting to participate in the MU ranging measurement procedure.

3. The method of claim 1, further comprising:

generating, at the first communication device, a third trigger frame according to the trigger frame format, wherein generating the third trigger frame includes:

setting the one or more trigger type information fields of the third trigger frame to a third one or more respective values that indicates the third trigger frame is for i) an MU ranging measurement procedure, and ii) causing the multiple second communication devices to simultaneously transmit ranging measurement readiness packets to the first communication device as part of a third MU transmission associated with the MU ranging measurement procedure;

transmitting, by the first communication device, the third trigger frame to cause at least some second communication devices to transmit ranging measurement readiness packets as part of the third MU transmission; and determining, at the first communication device and using information in the ranging measurement readiness packets, a group of second communication devices, from among the plurality of second communication devices, that are ready to participate in the MU ranging measurement procedure.

4. The method of claim 1, wherein the ranging measurement feedback information includes:

times corresponding to transmission of the multiple first NDPs transmitted simultaneously by at least some of the multiple second communication devices; and times corresponding to reception of the second NDP at the at least some of the multiple second communication devices.

5. The method of claim 1, further comprising:

generating, at the first communication device, a third trigger frame according to the trigger frame format, wherein generating the third trigger frame includes:

setting the trigger type field of the third trigger frame to the first value, and setting the trigger subtype subfield of the third trigger frame to a third value indicating that the third trigger frame is for causing the plurality of second communication devices to simultaneously transmit ranging measurement request packets to the first communication device as part of a third MU transmission associated with the MU ranging measurement procedure;

transmitting, by the first communication device, the third trigger frame to cause at least some second communication devices to transmit ranging measurement request packets as part of the third MU transmission; and determining, at the first communication device and using information in the ranging measurement request packets, a group of second communication devices, from among the plurality of second communication devices, that are requesting to participate in the MU ranging measurement procedure.

6. The method of claim 1, further comprising:

generating, at the first communication device, a third trigger frame according to the trigger frame format, wherein generating the third trigger frame includes:

setting the trigger type field of the third trigger frame to the first value, and setting the trigger subtype subfield of the third trigger frame to a third value indicating that the third trigger frame is for causing the multiple second communication devices to simultaneously transmit ranging measurement readiness packets to the first communication device as part of a third MU transmission associated with the MU ranging measurement procedure;

transmitting, by the first communication device, the third trigger frame to cause at least some second communication devices to transmit ranging measurement readiness packets as part of the third MU transmission; and determining, at the first communication device and using information in the ranging measurement readiness packets, a group of second communication devices, from among the plurality of second communication devices, that are ready to participate in the MU ranging measurement procedure.

7. An apparatus, comprising:
a network interface device associated with a first communication device, wherein the network interface device includes one or more integrated circuits (ICs), and wherein the network interface device is configured to:
generate a first trigger frame according to a trigger frame format that includes one or more trigger type information fields for indicating a type of multi-user (MU) frame exchange to which a trigger frame instance corresponds, wherein generating the first trigger frame includes:
setting the one or more trigger type information fields of the first trigger frame to a first one or more respective values that indicates the first trigger frame is for i) an MU ranging measurement procedure, and ii) causing multiple second communication devices from among a plurality of second communication devices to simultaneously transmit first null data packets (NDPs) to the first communication device as part of a first MU transmission associated with the MU ranging measurement procedure;
wherein the network interface device is also configured to:
transmit the first trigger frame to cause the multiple second communication devices to transmit the first NDPs as part of the first MU transmission;
receive the first MU transmission having multiple first NDPs transmitted simultaneously by at least some of the multiple second communication devices;
transmit a second NDP to the multiple second communication devices as part of the MU ranging measurement procedure; and
generate a second trigger frame according to the trigger frame format, wherein generating the second trigger frame includes:
setting the one or more trigger type information fields of the second trigger frame to a second one or more respective values that indicates the second trigger frame is for i) an MU ranging measurement procedure, and ii) causing the multiple second communication devices to simultaneously transmit feedback packets to the first communication device as part of a second MU transmission associated with the MU ranging measurement procedure;
wherein the network interface device is further configured to:
transmit the second trigger frame to cause the multiple second communication devices to transmit the feedback packets as part of the second MU transmission;
receive the second MU transmission having multiple feedback packets transmitted simultaneously by at least some of the multiple second communication devices, the multiple feedback packets including ranging measurement feedback information; and
calculate one or more respective distances between the first communication device and at least one of the multiple second communication devices using the measurement feedback information received in the second MU transmission;
wherein:

the trigger frame format includes: i) a trigger type field for indicating the type of MU frame exchange, and ii) a trigger subtype subfield in a trigger-type dependent field when the trigger type field is set to a first value that indicates the trigger frame is for the MU ranging measurement procedure;
generating the first trigger frame includes:
setting the trigger type field of the first trigger frame to the first value, and
setting the trigger subtype subfield of the first trigger frame to a second value indicating that the first trigger frame is for causing the multiple second communication devices to simultaneously transmit first NDPs to the first communication device as part of the first MU transmission associated with the MU ranging measurement procedure; and
generating the second trigger frame includes:
setting the trigger type field of the second trigger frame to the first value, and
setting the trigger subtype subfield of the second trigger frame to a third value indicating that the second trigger frame is for causing the multiple second communication devices to simultaneously transmit feedback packets to the first communication device as part of the second MU transmission associated with the MU ranging measurement procedure.

8. The apparatus of claim 7, wherein the network interface device is further configured to:
generate a third trigger frame according to the trigger frame format, wherein generating the third trigger frame includes:
setting the one or more trigger type information fields of the third trigger frame to a third one or more respective values that indicates the third trigger frame is for i) an MU ranging measurement procedure, and ii) causing the plurality of second communication devices to simultaneously transmit ranging measurement request packets to the first communication device as part of a third MU transmission associated with the MU ranging measurement procedure;
transmit the third trigger frame to cause at least some second communication devices to transmit ranging measurement request packets as part of the third MU transmission; and
determine, using information in the ranging measurement request packets, a group of second communication devices, from among the plurality of second communication devices, that are requesting to participate in the MU ranging measurement procedure.

9. The apparatus of claim 7, wherein the network interface device is further configured to:
generate a third trigger frame according to the trigger frame format, wherein generating the third trigger frame includes:
setting the one or more trigger type information fields of the third trigger frame to a third one or more respective values that indicates the third trigger frame is for i) an MU ranging measurement procedure, and ii) causing the multiple second communication devices to simultaneously transmit ranging measurement readiness packets to the first communication device as part of a third MU transmission associated with the MU ranging measurement procedure;

transmit the third trigger frame to cause at least some second communication devices to transmit ranging measurement readiness packets as part of the third MU transmission; and determine, using information in the ranging measurement readiness packets, a group of second communication devices, from among the plurality of second communication devices, that are ready to participate in the MU ranging measurement procedure.

10. The apparatus of claim 7, wherein the ranging measurement feedback information includes:
times corresponding to transmission of the multiple first NDPs transmitted simultaneously by at least some of the multiple second communication devices; and
times corresponding to reception of the second NDP at the at least some of the multiple second communication devices.

11. The apparatus of claim 7, wherein the network interface device is further configured to:
generate a third trigger frame according to the trigger frame format, wherein generating the third trigger frame includes:
setting the trigger type field of the third trigger frame to the first value, and
setting the trigger subtype subfield of the third trigger frame to a third value indicating that the third trigger frame is for causing the plurality of second communication devices to simultaneously transmit ranging measurement request packets to the first communication device as part of a third MU transmission associated with the MU ranging measurement procedure;
transmit the third trigger frame to cause at least some second communication devices to transmit ranging measurement request packets as part of the third MU transmission; and
determine, using information in the ranging measurement request packets, a group of second communication devices, from among the plurality of second communication devices, that are requesting to participate in the MU ranging measurement procedure.

12. The apparatus of claim 7, wherein the network interface device is further configured to:
generate a third trigger frame according to the trigger frame format, wherein generating the third trigger frame includes:
setting the trigger type field of the third trigger frame to the first value, and
setting the trigger subtype subfield of the third trigger frame to a third value indicating that the third trigger frame is for causing the multiple second communication devices to simultaneously transmit ranging measurement readiness packets to the first communication device as part of a third MU transmission associated with the MU ranging measurement procedure;
transmit the third trigger frame to cause at least some second communication devices to transmit ranging measurement readiness packets as part of the third MU transmission; and
determine, using information in the ranging measurement readiness packets, a group of second communication devices, from among the plurality of second communication devices, that are ready to participate in the MU ranging measurement procedure.

13. A method for performing ranging measurements, the method comprising:
receiving, at a first communication device and from a second communication device, a first trigger frame according to a trigger frame format that includes one or more trigger type information fields for indicating a type of multi-user (MU) frame exchange to which a trigger frame instance corresponds, wherein the first trigger frame includes:
the one or more trigger type information fields of the first trigger frame set to a first one or more respective values that indicates the first trigger frame is for i) an MU ranging measurement procedure, and ii) causing the first communication device and one or more third communication devices to simultaneously transmit respective first null data packets (NDPs) to the second communication device as part of a first MU transmission associated with the MU ranging measurement procedure;
transmitting, by the first communication device to the second communication device, a first NDP as part of the first MU transmission in response to the first trigger frame;
receiving, at the first communication device and from the second communication device, a second NDP as part of the MU ranging measurement procedure;
receiving, at the first communication device and from the second communication device, a second trigger frame according to the trigger frame format, wherein the second trigger frame includes:
the one or more trigger type information fields of the second trigger frame set to a second one or more respective values that indicates the second trigger frame is for i) an MU ranging measurement procedure, and ii) causing the first communication device and the one or more third communication devices to simultaneously transmit respective feedback packets to the second communication device as part of a second MU transmission associated with the MU ranging measurement procedure; and
transmitting, by the first communication device to the second communication device, a feedback packet as part of the second MU transmission in response to the second trigger frame, the feedback packet including ranging measurement feedback information, wherein the ranging measurement feedback information is useable at the second communication device to calculate a distance between the first communication device and the second communication device;
wherein:
the trigger frame format includes: i) a trigger type field for indicating the type of MU frame exchange, and ii) a trigger subtype subfield in a trigger-type dependent field when the trigger type field is set to a first value that indicates the trigger frame is for the MU ranging measurement procedure;
the first trigger frame includes:
the trigger type field set to the first value, and
the trigger subtype subfield set to a second value indicating that the first trigger frame is for causing the first communication device and the one or more third communication devices to simultaneously transmit respective first NDPs to the second communication device as part of the first MU transmission associated with the MU ranging measurement procedure; and
the second trigger frame includes:
the trigger type field set to the first value, and the trigger subtype subfield set to a third value indicating that the second trigger frame is for causing the first communication device and the one or more third communication devices to simultaneously transmit feedback packets to the second communication device as part of the second MU transmission associated with the MU ranging measurement procedure.

14. The method of claim 13, further comprising:
receiving, at the first communication device and from the second communication device, a third trigger frame according to the trigger frame format, wherein the third trigger frame includes:
the one or more trigger type information fields of the third trigger frame set to a third one or more respective values that indicates the third trigger frame is for i) an MU ranging measurement procedure, and ii) causing the first communication device and the one or more third communication devices to simultaneously transmit ranging measurement request packets to the second communication device as part of a third MU transmission associated with the MU ranging measurement procedure; and
transmitting, by the first communication device to the second communication device, a ranging measurement request packet as part of the third MU transmission.

15. The method of claim 13, further comprising:
receiving, at the first communication device and from the second communication device, a third trigger frame according to the trigger frame format, wherein the third trigger frame includes:
the one or more trigger type information fields of the third trigger frame set to a third one or more respective values that indicates the third trigger frame is for i) an MU ranging measurement procedure, and ii) causing the first communication device and the one or more third communication devices to simultaneously transmit ranging measurement readiness packets to the second communication device as part of a third MU transmission associated with the MU ranging measurement procedure; and
transmitting, by the first communication device to the second communication device, a ranging measurement readiness packet as part of the third MU transmission.

16. The method of claim 13, wherein ranging measurement feedback information includes:
a time corresponding to transmission of the first NDP, from the first communication device, as part of the first MU transmission in response to the first trigger frame; and
a time corresponding to reception of the second NDP at the first communication device.

17. The method of claim 13, further comprising:
receiving, at the first communication device from the second communication device, a third trigger frame according to the trigger frame format, wherein the third trigger frame includes:
the trigger type field set to the first value, and
the trigger subtype subfield set to a third value indicating that the third trigger frame is for causing the first communication device and the one or more third communication devices to simultaneously transmit ranging measurement request packets to the second communication device as part of a third MU transmission associated with the MU ranging measurement procedure; and
transmitting, by the first communication device to the second communication device, a ranging measurement request packet as part of the third MU transmission.

18. The method of claim 13, further comprising:
receiving, at the first communication device from the second communication device, a third trigger frame according to the trigger frame format, wherein the third trigger frame includes:
the trigger type field set to the first value, and
the trigger subtype subfield set to a third value indicating that the third trigger frame is for causing the first communication device and the one or more third communication devices to simultaneously transmit ranging measurement readiness packets to the second communication device as part of a third MU transmission associated with the MU ranging measurement procedure; and
transmitting, by the first communication device to the second communication device, a ranging measurement readiness packet as part of the third MU transmission.

19. An apparatus, comprising:
a network interface device associated with a first communication device, wherein the network interface device includes one or more integrated circuits (ICs), and wherein the network interface device is configured to:
receive, from a second communication device, a first trigger frame according to a trigger frame format that includes one or more trigger type information fields for indicating a type of multi-user (MU) frame exchange to which a trigger frame instance corresponds, wherein the first trigger frame includes:
the one or more trigger type information fields of the first trigger frame set to a first one or more respective values that indicates the first trigger frame is for i) an MU ranging measurement procedure, and ii) causing the first communication device and one or more third communication devices to simultaneously transmit respective first null data packets (NDPs) to the second communication device as part of a first MU transmission associated with the MU ranging measurement procedure;
wherein the network interface device is also configured to:
transmit, to the second communication device, a first NDP as part of the first MU transmission in response to the first trigger frame;
receive, from the second communication device, a second NDP as part of the MU ranging measurement procedure; and
receive, from the second communication device, a second trigger frame according to the trigger frame format, wherein the second trigger frame includes:
the one or more trigger type information fields of the second trigger frame set to a second one or more respective values that indicates the second trigger frame is for i) an MU ranging measurement procedure, and ii) causing the first communication device and the one or more third communication devices to simultaneously transmit respective feedback packets to the second communication device as part of a second MU transmission associated with the MU ranging measurement procedure; and
wherein the network interface device is further configured to:

transmit, to the second communication device, a feedback packet as part of the second MU transmission in response to the second trigger frame, the feedback packet including ranging measurement feedback information, wherein the ranging measurement feedback information is useable at the second communication device to calculate a distance between the first communication device and the second communication device;

wherein:
the trigger frame format includes: i) a trigger type field for indicating the type of MU frame exchange, and ii) a trigger subtype subfield in a trigger-type dependent field when the trigger type field is set to a first value that indicates the trigger frame is for the MU ranging measurement procedure;
the first trigger frame includes:
the trigger type field set to the first value, and
the trigger subtype subfield set to a second value indicating that the first trigger frame is for causing the first communication device and the one or more third communication devices to simultaneously transmit respective first NDPs to the second communication device as part of the first MU transmission associated with the MU ranging measurement procedure; and
the second trigger frame includes:
the trigger type field set to the first value, and
the trigger subtype subfield set to a third value indicating that the second trigger frame is for causing the first communication device and the one or more third communication devices to simultaneously transmit feedback packets to the second communication device as part of the second MU transmission associated with the MU ranging measurement procedure.

20. The apparatus of claim 19, wherein the network interface device is further configured to:
receive, from the second communication device, a third trigger frame according to the trigger frame format, wherein the third trigger frame includes:
the one or more trigger type information fields of the third trigger frame set to a third one or more respective values that indicates the third trigger frame is for i) an MU ranging measurement procedure, and ii) causing the first communication device and the one or more third communication devices to simultaneously transmit ranging measurement request packets to the second communication device as part of a third MU transmission associated with the MU ranging measurement procedure; and
transmit, to the second communication device, a ranging measurement request packet as part of the third MU transmission.

21. The apparatus of claim 19, wherein the network interface device is further configured to:
receive, from the second communication device, a third trigger frame according to the trigger frame format, wherein the third trigger frame includes:
the one or more trigger type information fields of the third trigger frame set to a third one or more respective values that indicates the third trigger frame is for i) an MU ranging measurement procedure, and ii) causing the first communication device and the one or more third communication devices to simultaneously transmit ranging measurement readiness packets to the second communication device as part of a third MU transmission associated with the MU ranging measurement procedure; and
transmit, to the second communication device, a ranging measurement readiness packet as part of the third MU transmission.

22. The apparatus of claim 19, wherein ranging measurement feedback information includes:
a time corresponding to transmission of the first NDP, from the first communication device, as part of the first MU transmission in response to the first trigger frame; and
a time corresponding to reception of the second NDP at the first communication device.

23. The apparatus of claim 19, wherein the network interface device is further configured to:
receive, from the second communication device, a third trigger frame according to the trigger frame format, wherein the third trigger frame includes:
the trigger type field set to the first value, and
the trigger subtype subfield set to a third value indicating that the third trigger frame is for causing the first communication device and the one or more third communication devices to simultaneously transmit ranging measurement request packets to the second communication device as part of a third MU transmission associated with the MU ranging measurement procedure; and
transmit, the second communication device, a ranging measurement request packet as part of the third MU transmission.

24. The apparatus of claim 19, wherein the network interface device is further configured to:
receive, from the second communication device, a third trigger frame according to the trigger frame format, wherein the third trigger frame includes:
the trigger type field set to the first value, and
the trigger subtype subfield set to a third value indicating that the third trigger frame is for causing the first communication device and the one or more third communication devices to simultaneously transmit ranging measurement readiness packets to the second communication device as part of a third MU transmission associated with the MU ranging measurement procedure; and
transmit, to the second communication device, a ranging measurement readiness packet as part of the third MU transmission.

* * * * *